(12) United States Patent
Asami

(10) Patent No.: US 9,632,288 B2
(45) Date of Patent: Apr. 25, 2017

(54) IMAGING LENS AND IMAGING APPARATUS

(71) Applicant: FUJIFILM Corporation, Tokyo (JP)

(72) Inventor: Taro Asami, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 42 days.

(21) Appl. No.: 14/857,205

(22) Filed: Sep. 17, 2015

(65) Prior Publication Data

US 2016/0004046 A1 Jan. 7, 2016

Related U.S. Application Data

(63) Continuation of application No. PCT/JP2013/007608, filed on Dec. 26, 2013.

(30) Foreign Application Priority Data

Mar. 27, 2013 (JP) .................. 2013-066444

(51) Int. Cl.
*G02B 13/18* (2006.01)
*G02B 13/04* (2006.01)
*G02B 9/62* (2006.01)
*G02B 13/00* (2006.01)
*G02B 3/04* (2006.01)
(Continued)

(52) U.S. Cl.
CPC ......... *G02B 13/0045* (2013.01); *G02B 13/04* (2013.01); *G02B 13/18* (2013.01); *G02B 3/04* (2013.01); *G02B 5/005* (2013.01); *G02B 9/62* (2013.01); *G02B 13/002* (2013.01); *G02B 15/177* (2013.01)

(58) Field of Classification Search
CPC ...... G02B 13/0045; G02B 9/62; G02B 13/18; G02B 5/005; G02B 3/04; G02B 13/002; G02B 15/177

USPC ................. 359/713, 740, 752, 761
See application file for complete search history.

(56) References Cited

U.S. PATENT DOCUMENTS 5,363,243 A 11/1994 Takayuki et al.
5,644,434 A 7/1997 Hagimori
(Continued)

FOREIGN PATENT DOCUMENTS

JP 64-72112 3/1989
JP 05-88085 4/1993
(Continued)

OTHER PUBLICATIONS

International Search Report, PCT/JP2013/007608, Mar. 25, 2014.
International Search Opinion, PCT/IPEA/409.
Chinese Official Action—201380074870.7—Nov. 30, 2016.

*Primary Examiner* — Evelyn A Lester
(74) *Attorney, Agent, or Firm* — Young & Thompson

(57) ABSTRACT

An imaging lens consists of a negative first lens, a positive second lens, a negative third lens, a positive fourth lens, a positive fifth lens, and a negative sixth lens in order from the object side. The Abbe number of the material of the sixth lens with respect to the d-line is less than or equal to 30. When the radius of curvature of the object side surface of the third lens is taken as R3F, the radius of curvature of the image side surface of the third lens is taken as R3R, and the Abbe number of the material of the third lens with respect to the d-line is taken as vd3, the following conditional expressions are satisfied:

$$1.35 < (R3F+R3R)/(R3F-R3R) < 6.0 \quad (1)$$

$$vd3 < 30.0 \quad (2).$$

19 Claims, 7 Drawing Sheets

(51) Int. Cl.
 G02B 15/177 (2006.01)
 G02B 5/00 (2006.01)

(56) References Cited

U.S. PATENT DOCUMENTS

| | | |
|---|---|---|
| 5,786,944 A | 7/1998 | Hagimori et al. |
| 5,808,812 A | 9/1998 | Kamo |
| 6,104,546 A | 8/2000 | Yoshikawa |
| 8,054,562 B2 * | 11/2011 | Asami .................. G02B 9/62 359/752 |
| 2006/0280498 A1 | 12/2006 | Souma et al. |
| 2008/0158439 A1 | 7/2008 | Nishikawa |
| 2009/0109548 A1 | 4/2009 | Kimura |
| 2010/0046094 A1 | 2/2010 | Asami |
| 2010/0103538 A1 | 4/2010 | Kitahara |

FOREIGN PATENT DOCUMENTS

| | | |
|---|---|---|
| JP | 07-311339 | 11/1995 |
| JP | 09-21952 | 1/1997 |
| JP | 09-152549 | 6/1997 |
| JP | 11-142730 | 5/1999 |
| JP | 11-160618 | 6/1999 |
| JP | 2005-164839 | 6/2005 |
| JP | 2006-039259 | 2/2006 |
| JP | 2006-343554 | 12/2006 |
| JP | 2008-116688 | 5/2008 |
| JP | 2009-109630 | 5/2009 |
| JP | 2010-072622 | 4/2010 |
| JP | 2010-107531 | 5/2010 |
| JP | 2011-075646 | 4/2011 |
| WO | 2012/086199 | 6/2016 |

* cited by examiner

FIG.1
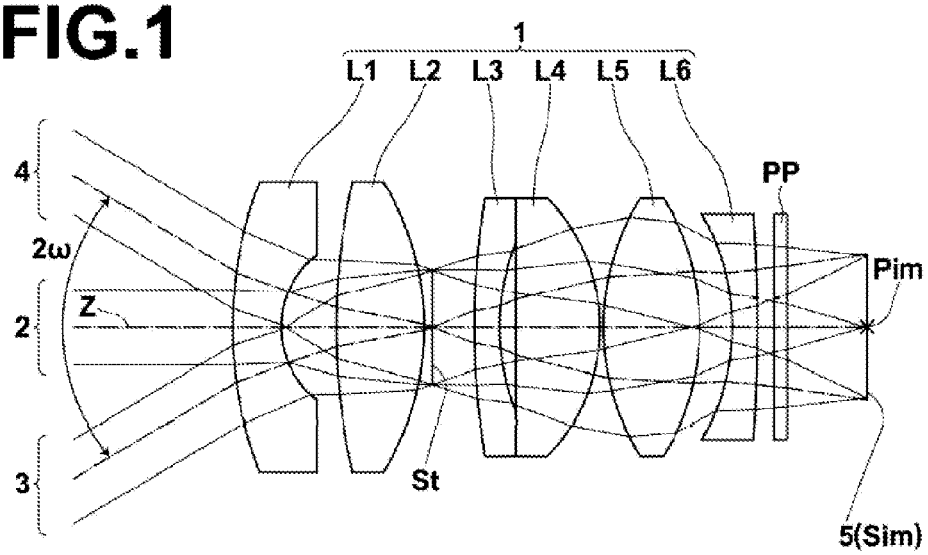
FIG.2 EXAMPLE 1
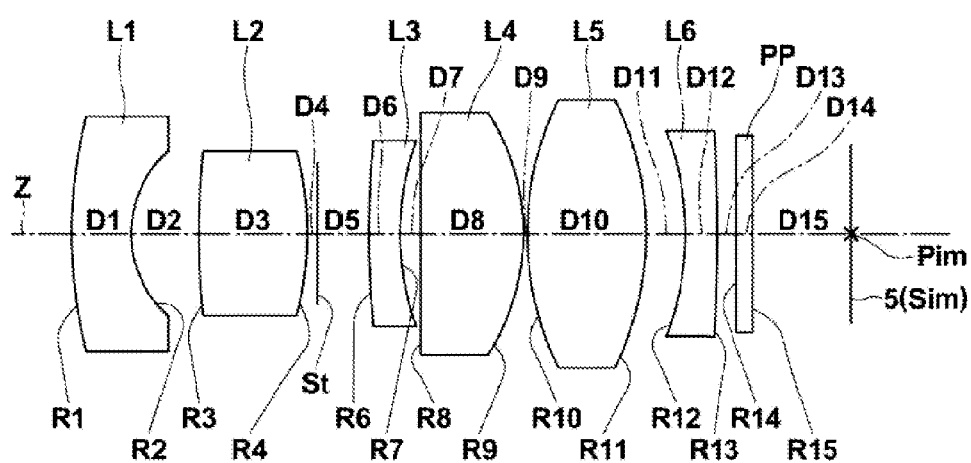

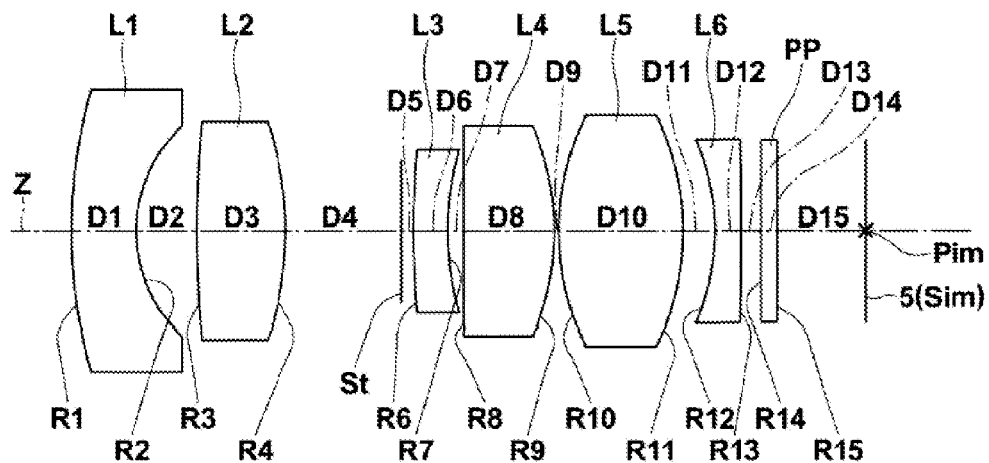
FIG.3    EXAMPLE 2
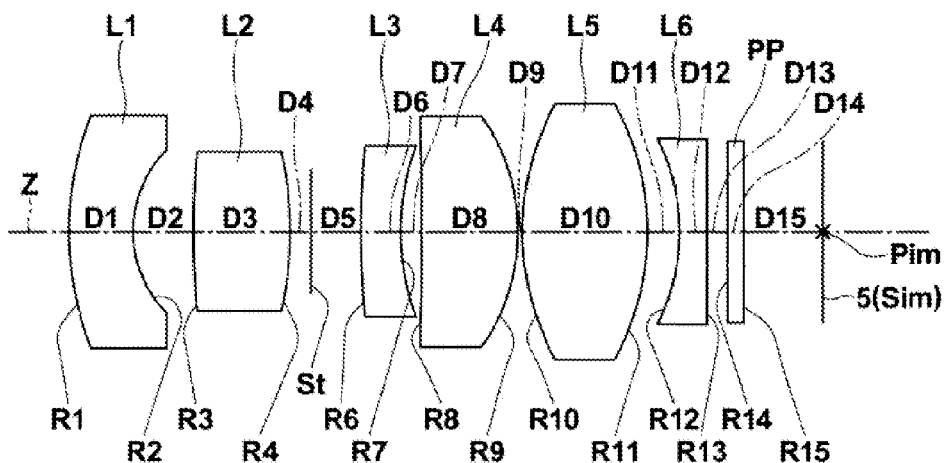
FIG.4    EXAMPLE 3

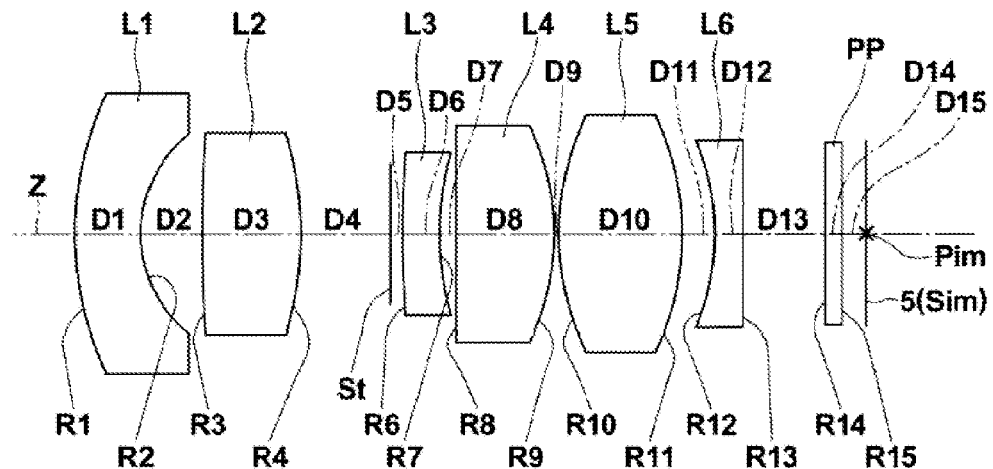
FIG.5 EXAMPLE 4
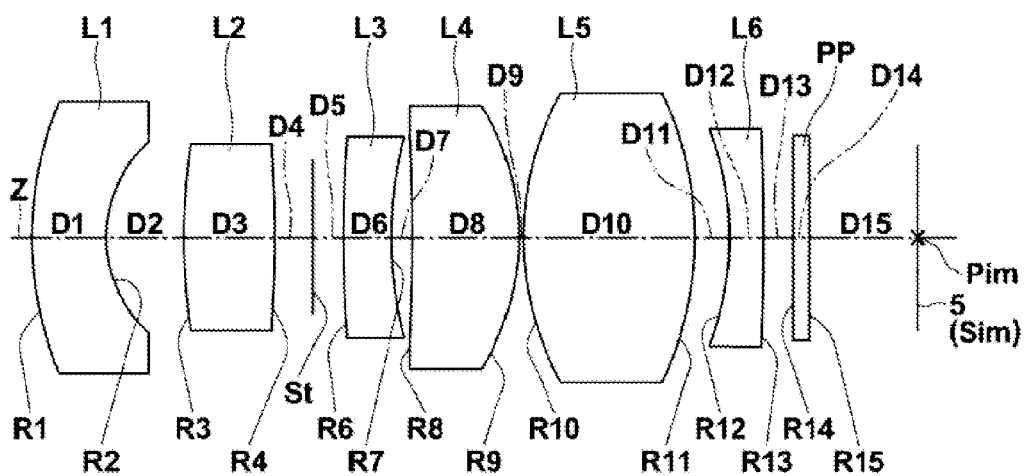
FIG.6 EXAMPLE 5

FIG.7  EXAMPLE 6
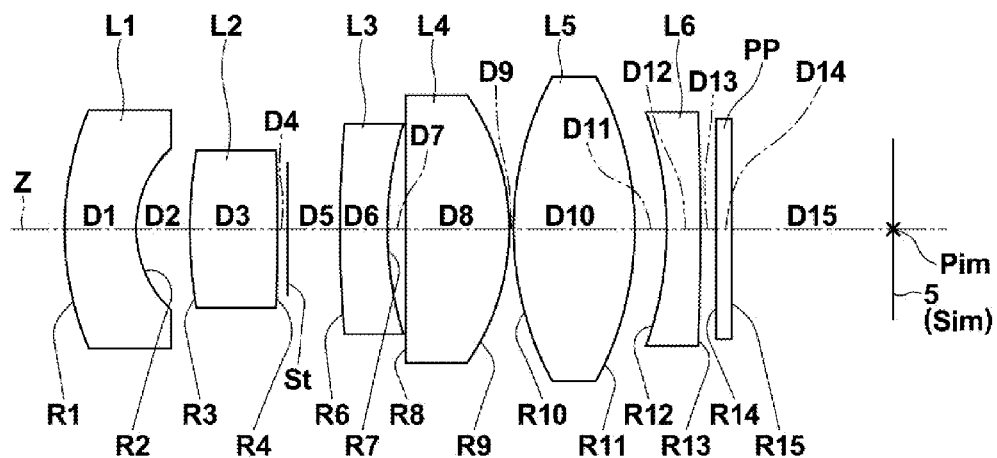
FIG.8  EXAMPLE 1
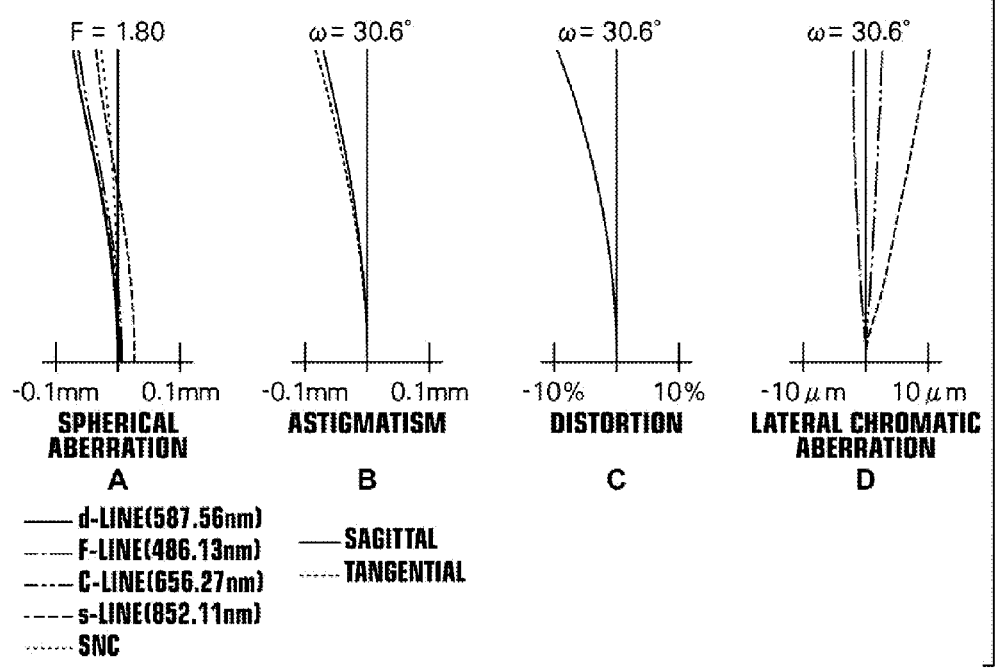

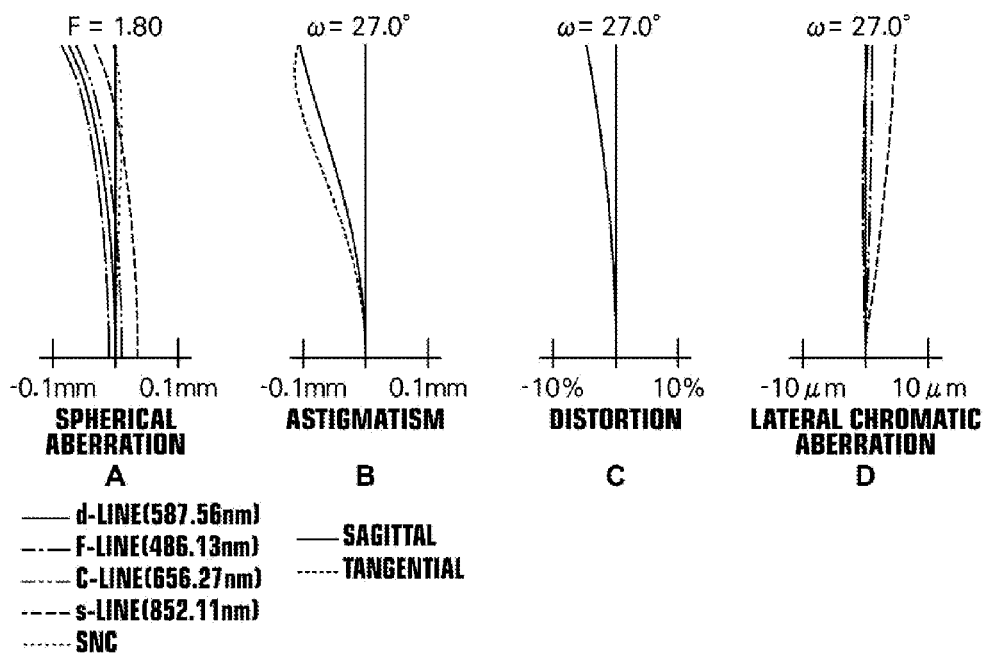
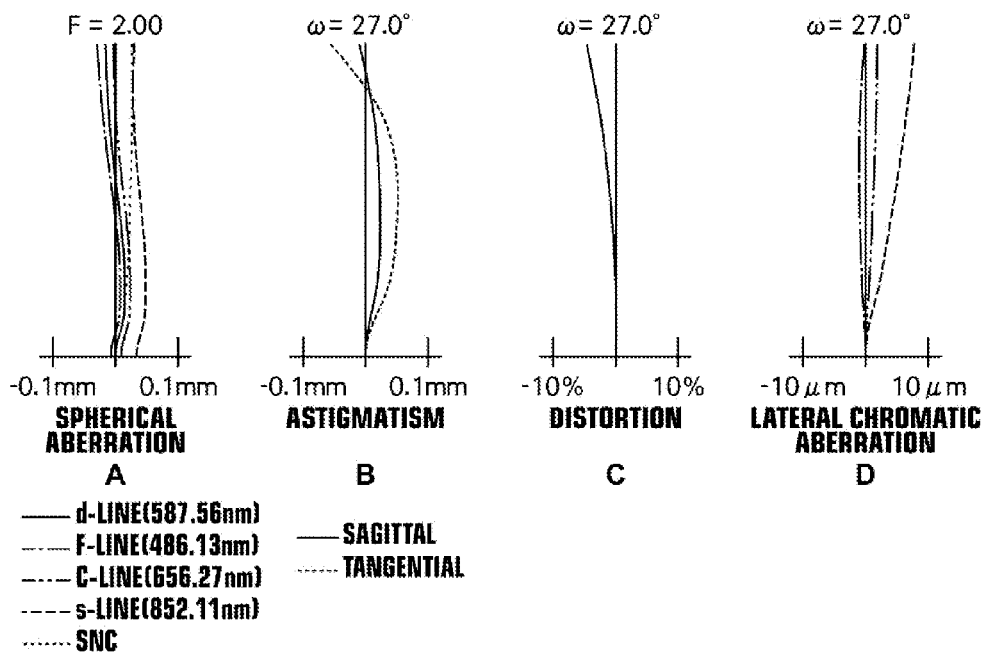

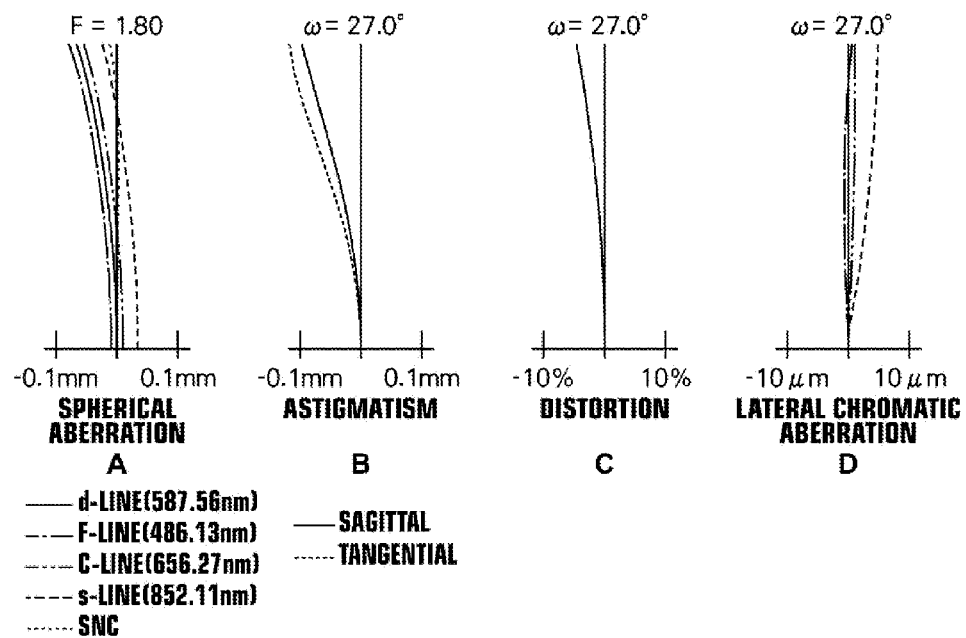
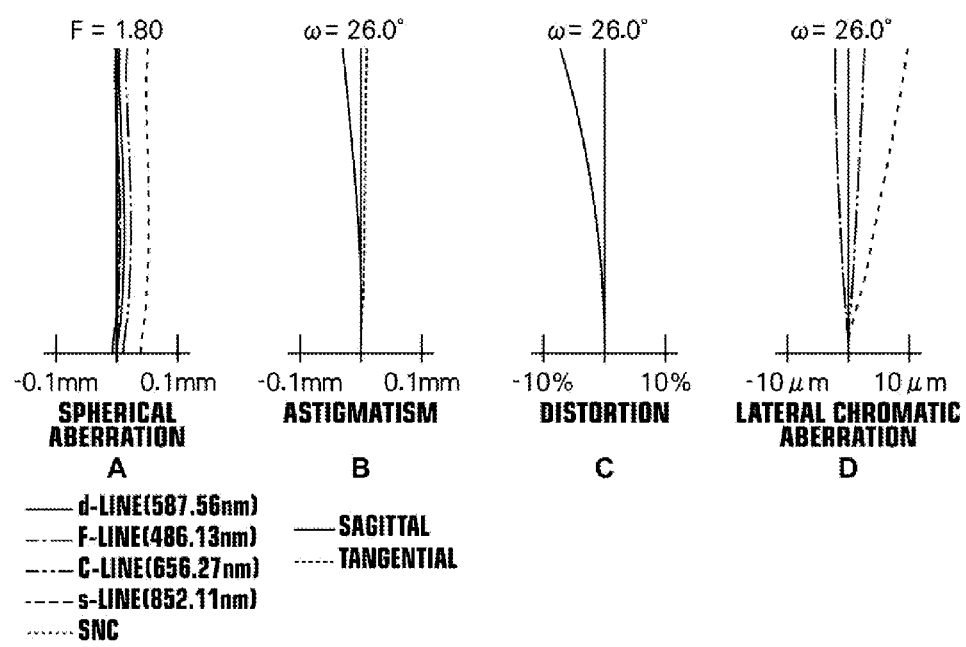

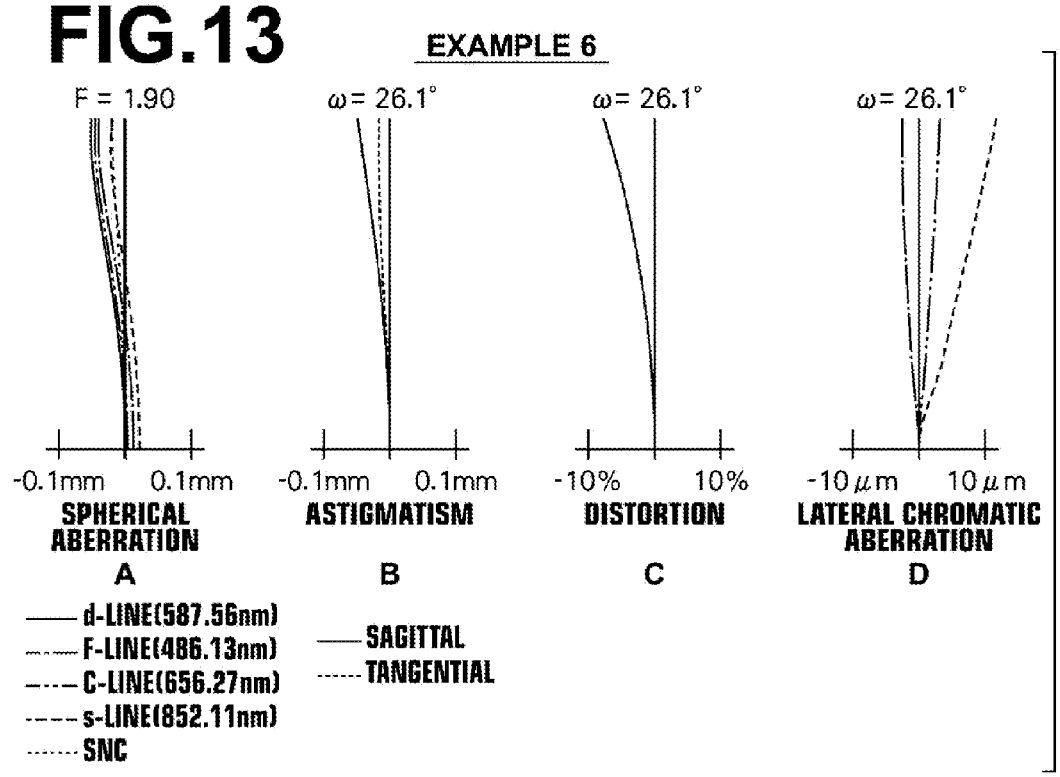
FIG.13 EXAMPLE 6
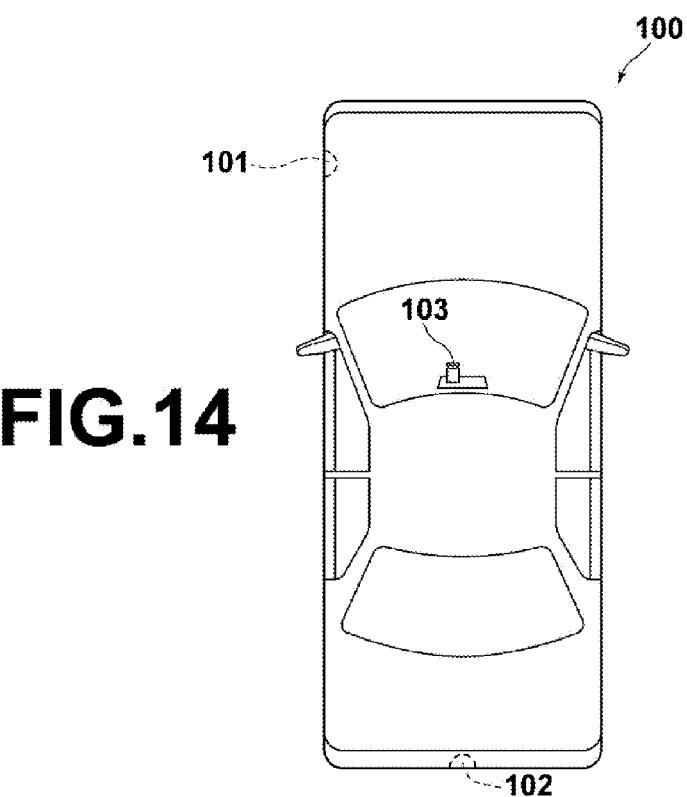
FIG.14

IMAGING LENS AND IMAGING APPARATUS

CROSS-REFERENCE TO RELATED APPLICATIONS

This application is a Continuation of PCT International Application No. PCT/JP2013/007608 filed on Dec. 26, 2013, which claims priority under 35 U.S.C. §119 (a) to Japanese Patent Application No. 2013-066444 filed on Mar. 27, 2013. Each of the above applications is hereby expressly incorporated by reference, in its entirety, into the present application.

BACKGROUND

The present disclosure relates to an imaging lens and an imaging apparatus, and more specifically to an imaging lens suitable for use, for example, in vehicle cameras, portable terminal cameras, and surveillance cameras which use a CCD (Charge Coupled Device), a CMOS (Complementary Metal Oxide Semiconductor), and the like, and an imaging apparatus equipped with the imaging lens.

Recently, the downsizing and the trend towards high pixel count in image sensors such as, CCD and CMOS, have been advancing rapidly. Along with this, the downsizing of the bodies of imaging devices and systems is also in progress. As such, imaging lenses mounted on these devices and systems are also demanded to be downsized, in addition to satisfactory optical performance. In the meantime, inexpensive configurations, wide angles, and high performance are demanded in the applications of vehicle cameras and surveillance cameras, along with the downsizing.

As an imaging lens mounted on vehicle cameras, Japanese Unexamined Patent Publication No. 2010-072622, Japanese Unexamined Patent Publication No. 2010-107531, and Japanese Unexamined Patent Publication No. 5(1993)-088085 describe a six-element imaging lens in which a negative lens, a positive lens, a negative lens, a positive lens, a positive lens, and a negative lens are arranged in order from the object side.

SUMMARY

In the meantime, requirements for imaging lenses mounted on vehicle cameras, surveillance cameras, and the like are getting severe year after year, and reducing F-number, as well as further reduction in cost, further increase in angle of view, and further improvement in performance are demanded. In particular, good chromatic aberration over the entire visible range is demanded.

In view of the circumstances described above, the present disclosure provides an imaging lens having a small F-number and is capable of realizing cost reduction, wider angle of view, and performance improvement. It is a further object of the present disclosure to provide an imaging apparatus equipped with the imaging lens.

A first imaging lens of the present disclosure consists of a first lens having a negative power, a second lens having a positive power, a third lens having a negative power, a fourth lens having a positive power, a fifth lens having a positive power, and a sixth lens having a negative power, in order from the object side, in which the following conditional expressions are satisfied:

$$1.35 < (R3F+R3R)/(R3F-R3R) < 6.0 \quad (1)$$

$$vd3 < 30.0 \quad (2)$$

where:
R3F is the radius of curvature of the object side surface of the third lens;
R3R is the radius of curvature of the image side surface of the third lens; and
vd3 is the Abbe number of the material of the third lens with respect to the d-line.

A second imaging lens of the present disclosure consists of a first lens having a negative power, a second lens having a positive power, a third lens having a negative power, a fourth lens having a positive power, a fifth lens having a positive power, and a sixth lens having a negative power, in order from the object side, in which the following conditional expression is satisfied:

$$1.35 < (R3F+R3R)/(R3F-R3R) < 2.20 \quad (1\text{-}1)$$

where:
R3F is the radius of curvature of the object side surface of the third lens; and
R3R is the radius of curvature of the image side surface of the third lens.

A third imaging lens of the present disclosure consists of a first lens having a negative power, a second lens having a positive power, a third lens having a negative power, a fourth lens having a positive power, a fifth lens having a positive power, and a sixth lens having a negative power, in order from the object side, in which the following conditional expressions are satisfied:

$$vd3 < 30.0 \quad (2)$$

$$f3/f < -1.4 \quad (3)$$

where:
vd3 is the Abbe number of the material of the third lens with respect to the d-line;
f3 is the focal length of the third lens; and
f is the focal length of the entire system.

The first imaging lens of the present disclosure may have at least either of the configurations of the second and third imaging lenses. The second imaging lens of the present disclosure may have at least either of the configurations of the first and third imaging lenses. The third imaging lens of the present disclosure may have at least either of the configurations of the first and second imaging lenses.

The imaging lens of the present disclosure consists of six lenses, but may further include a lens having substantially no power, an aperture stop, an optical element other than a lens, such as a cover glass and the like, a lens flange, a lens barrel, an image sensor, a mechanical component, such as a camera shake correction mechanism, and the like, in addition to the six lenses.

In the present disclosure, surface shapes of lenses, such as convex surface, concave surface, planar surface, biconcave, meniscus, biconvex, plano-convex, plano-concave, and the like, and the signs of a refractive power, such as positive and negative, are considered in the paraxial region if it includes an aspherical surface unless otherwise specifically described. Further, in the present disclosure, the sign of a radius of curvature is positive for a surface shape with a convex surface on the object side and negative for a surface shape with a convex surface on the image side. The term "center of the lens surface has a positive power" refers to that the paraxial radius of curvature of the lens surface has such a value so as to form a convex surface, and the term "center of the lens surface has a negative power" refers to that the paraxial radius of curvature of the lens surface has such a value so as to form a concave surface.

In the first to the third imaging lenses of the present disclosure, a material having a negative temperature coefficient of refractive-index, dn/dt with respect the d-line may be used for a lens having a positive power in the lens system.

Preferably, the first to the third imaging lenses satisfy conditional expressions (4) to (12) given below. A preferable aspect may have any one of or a combination of any two or more of the following conditional expressions (4) to (12).

$$1.0 < f2/f \quad (4)$$

$$1.0 < f4/f \quad (5)$$

$$0.15 < vd4/vd5 < 3.0 \quad (6)$$

$$1.5 < f34/f < 5.0 \quad (7)$$

$$0.3 < vd1/vd2 < 2.5 \quad (8)$$

$$2.0 < L/f < 10.0 \quad (9)$$

$$0.2 < Bf/f < 2.0 \quad (10)$$

$$0.2 < f45/f < 3.0 \quad (11)$$

$$1.5 < f56/f < 7.5 \quad (12)$$

where:
f2 is the focal length of the second lens;
f4 is the focal length of the fourth lens;
f34 is the combined focal length of the third lens and the fourth lens;
f45 is the combined focal length of the fourth lens and the fifth lens;
f56 is the combined focal length of the fifth lens and the sixth lens;
f is the focal length of the entire system;
vd1 is the Abbe number of the material of the first lens with respect to the d-line;
vd2 is the Abbe number of the material of the second lens with respect to the d-line;
vd4 is the Abbe number of the material of the fourth lens with respect to the d-line;
vd5 is the Abbe number of the material of the fifth lens with respect to the d-line;
L is the distance from the object side surface of the first lens to the image plane (air equivalent length for the back focus portion); and
Bf is the distance from the image side surface of the most image side lens to the image sensor (back focus, air equivalent length).

An imaging apparatus of the present disclosure is equipped with at least any one of the first to the third imaging lenses.

According to the first imaging lens of the present disclosure, the power arrangement and the like are set appropriately over the entire system, in a lens system composed of a minimum number of six lenses, to satisfy the conditional expressions (1) and (2). This allows for realization of an imaging lens satisfactorily corrected in aberrations and has a high optical performance capable of obtaining a high quality image to a peripheral portion of the imaging area, as well as capable of ensuring a back focus and achieving downsizing, cost reduction, and wider angle of view.

According to the second imaging lens of the present disclosure, the power arrangement and the like are set appropriately over the entire system, in a lens system composed of a minimum number of six lenses, to satisfy the conditional expression (1-1). This allows for realization of an imaging lens satisfactorily corrected in aberrations and has a high optical performance capable of obtaining a high quality image to the periphery of the imaging area, as well as capable of securing a back focus and achieving downsizing, cost reduction, and wider angle of view.

According to the third imaging lens of the present disclosure, the power arrangement and the like are set appropriately over the entire system, in a lens system composed of a minimum number of six lenses, to satisfy the conditional expressions (2) and (3). This allows for realization of an imaging lens satisfactorily corrected in aberrations and has a high optical performance capable of obtaining a high quality image to the periphery of the imaging area, as well as capable of securing a back focus and achieving downsizing, cost reduction, and wider angle of view.

According to the imaging apparatus of the present disclosure, the apparatus may be formed small and inexpensively, allows imaging with a wide angle of view, and may obtain a high resolution quality image, as the apparatus is equipped with the imaging lens of the present disclosure.

BRIEF DESCRIPTION OF THE DRAWINGS

FIG. 1 is a diagram illustrating a configuration and optical paths of an imaging lens according to one embodiment of the present disclosure.

FIG. 2 is a cross-sectional view of an imaging lens of Example 1 of the present disclosure, illustrating the configuration thereof.

FIG. 3 is a cross-sectional view of an imaging lens of Example 2 of the present disclosure, illustrating the configuration thereof.

FIG. 4 is a cross-sectional view of an imaging lens of Example 3 of the present disclosure, illustrating the configuration thereof.

FIG. 5 is a cross-sectional view of an imaging lens of Example 4 of the present disclosure, illustrating the configuration thereof.

FIG. 6 is a cross-sectional view of an imaging lens of Example 5 of the present disclosure, illustrating the configuration thereof.

FIG. 7 is a cross-sectional view of an imaging lens of Example 6 of the present disclosure, illustrating the configuration thereof.

A to D of FIG. 8 show each aberration diagram of Example 1 of the present disclosure.

A to D of FIG. 9 show each aberration diagram of Example 2 of the present disclosure.

A to D of FIG. 10 show each aberration diagram of Example 3 of the present disclosure.

A to D of FIG. 11 show each aberration diagram of Example 4 of the present disclosure.

A to D of FIG. 12 show each aberration diagram of Example 5 of the present disclosure.

A to D of FIG. 13 show each aberration diagram of Example 6 of the present disclosure.

FIG. 14 illustrates an arrangement of imaging apparatuses for vehicle according to an embodiment of the present disclosure.

DETAILED DESCRIPTION OF THE PREFERRED EMBODIMENTS

Hereinafter, embodiments of the present disclosure will be described in detail with reference to the accompanying drawings.

[Embodiments of Imaging Lens]

An imaging lens according to an embodiment of the present disclosure will be described with reference to FIG. 1. FIG. 1 is a diagram illustrating a configuration and optical paths of an imaging lens 1 according to an embodiment of the present disclosure. Note that the imaging lens 1 illustrated in FIG. 1 corresponds to an imaging lens according to Example 1 of the present disclosure, to be described later.

In FIG. 1, the left side of the drawing is the object side and the right side is the image side, and an axial light beam 2 and off-axis light beams 3 and 4 at the total angle of view 2co from an object point at infinity are also illustrated. In FIG. 1, an image sensor 5 disposed on the image plane Sim that includes the image point Pim of the imaging lens 1 is also illustrated, taking into account the case in which the imaging lens 1 is applied to an imaging apparatus. The image sensor 5 convers an optical image formed by the imaging lens 1 to an electrical signal and, for example, a CCD image sensor or a CMOS image sensor may be used.

When applying the imaging lens 1 to an imaging apparatus, a cover glass and a low-pass filter or an infrared cut filter are preferably provided according to the structure on the camera side, and FIG. 1 illustrates an example case in which a parallel plate optical member PP which assumes these is disposed between the most image side lens and the image sensor 5 (image plane Sim).

The configuration of the first embodiment of the present disclosure will be described first. The imaging lens according to the first embodiment includes a first lens L1 having a negative power, a second lens L2 having a positive power, a third lens L3 having a negative power, a fourth lens L4 having a positive power, a fifth lens L5 having a positive power, and a sixth lens L6 having a negative power, in order from the object side. FIG. 1 shows an example in which an aperture stop St is disposed between the second lens L2 and the third lens L3. The aperture stop St in FIG. 1 does not represent the shape or size but indicates the position on the optical axis Z.

The imaging lens of the first embodiment is configured to satisfy conditional expressions (1) and (2) given below:

$$1.35 < (R3F+R3R)/(R3F-R3R) < 6.0 \quad (1)$$

$$vd3 < 30.0 \quad (2)$$

where:
R3F is the radius of curvature of the object side surface of the third lens;
R3R is the radius of curvature of the image side surface of the third lens; and
vd3 is the Abbe number of the material of the third lens with respect to the d-line.

The imaging lens of the first embodiment is composed of a small number of lenses, i.e. minimum six lenses, and the power arrangement and the like are set appropriately over the entire system, whereby cost reduction and downsizing of the overall length in an optical axis direction are realized. The use of a lens having a negative power as the first lens L1, which is the most object side lens, allows the lens system to have a wider angle of view and makes it easy to ensure a back focus, whereby it is easy to downsize the lens system in a diameter direction.

Satisfying the upper limit of the conditional expression (1) makes it easy to differentiate the radii of curvature of the object side surface and the image side surface of the third lens L3, whereby it is easy to increase the power of the third lens and to correct longitudinal chromatic aberration. Satisfying the lower limit of the conditional expression (1) makes it easy to correct spherical aberration and field curvature.

Satisfying the upper limit of the conditional expression (2) makes it easy to reduce the Abbe number of the material of the third lens L3 with respect to the di-line, whereby it is easy to correct longitudinal chromatic aberration.

The configuration of the second embodiment of the present disclosure will be described next. The imaging lens according to the second embodiment includes a first lens L1 having a negative power, a second lens L2 having a positive power, a third lens L3 having a negative power, a fourth lens L4 having a positive power, a fifth lens L5 having a positive power, and a sixth lens L6 having a negative power, in order from the object side. In the example shown in FIG. 1, an aperture stop St is disposed between the second lens L2 and the third lens L3.

The imaging lens of the second embodiment is configured to satisfy a conditional expression (1-1) given below:

$$1.35 < (R3F+R3R)/(R3F-R3R) < 2.20 \quad (1-1)$$

where:
R3F is the radius of curvature of the object side surface of the third lens; and
R3R is the radius of curvature of the image side surface of the third lens.

The imaging lens of the second embodiment is composed of a small number of lenses, i.e. minimum six lenses, and the power arrangement and the like are set appropriately over the entire system, whereby cost reduction and downsizing of the overall length in an optical axis direction are realized. The use of a lens having a negative power as the first lens L1, which is the most object side lens, allows the lens system to have a wider angle of view and makes it easy to ensure a back focus, whereby it is easy to downsize the lens system in a diameter direction.

Satisfying the upper limit of the conditional expression (1-1) makes it easy to differentiate the radii of curvature of the object side surface and the image side surface of the third lens L3, whereby it is easy to increase the power of the third lens and to correct longitudinal chromatic aberration. Satisfying the lower limit of the conditional expression (1-1) makes it easy to correct spherical aberration and field curvature. Note that, as the upper limit of the conditional expression (1-1) is smaller than that of the conditional expression (1) of the imaging lens of the first embodiment, satisfying the upper limit of the conditional expression (1-1) allows the power of the third lens L3 to be increased more than that in the case where the upper limit of the conditional expression (1) is satisfied. Therefore, satisfying the upper limit of the conditional expression (1-1) makes it easy to correct longitudinal chromatic aberration even if the conditional expression (2) is not satisfied.

The configuration of the third embodiment of the present disclosure will be described next. The imaging lens according to the third embodiment includes a first lens L1 having a negative power, a second lens L2 having a positive power, a third lens L3 having a negative power, a fourth lens L4 having a positive power, a fifth lens L5 having a positive power, and a sixth lens L6 having a negative power, in order from the object side. In the example shown in FIG. 1, an aperture stop St is disposed between the second lens L2 and the third lens L3.

The imaging lens of the third embodiment is configured to satisfy a conditional expressions (2) and (3) given below:

$$vd3<30.0 \quad (2)$$

$$f3/f<-1.4 \quad (3)$$

where:
vd3 is the Abbe number of the material of the third lens with respect to the d-line;
f3 is the focal length of the third lens; and
f is the focal length of the entire system.

The imaging lens of the third embodiment is composed of a small number of lenses, i.e. minimum six lenses, and the power arrangement and the like are set appropriately over the entire system, whereby cost reduction and downsizing of the overall length in an optical axis direction are realized. The use of a lens having a negative power as the first lens L1, which is the most object side lens, allows the lens system to have a wider angle of view and makes it easy to ensure a back focus, whereby it is easy to downsize the lens system in a diameter direction.

Satisfying the upper limit of the conditional expression (2) makes it easy to reduce the Abbe number of the material of the third lens L3 with respect to the d-line, whereby it is easy to correct longitudinal chromatic aberration.

Satisfying the upper limit of the conditional expression (3) makes it easy to correct spherical aberration and field curvature.

Note that the imaging lens of the first embodiment may have a configuration of the imaging lens of the second or the third embodiment, or may have configurations of the imaging lenses of the second and the third embodiments. The imaging lens of the second embodiment may have a configuration of the imaging lens of the first or the third embodiment, or may have configurations of the imaging lenses of the first and the third embodiments. The imaging lens of the third embodiment may have a configuration of the imaging lens of the first or the second embodiment, or may have configurations of the imaging lenses of the first and the second embodiments.

Further, the imaging lens according to the first embodiment may have a part of a configuration of the imaging lens according to the second or the third embodiment. The imaging lens according to the second embodiment may have a part of a configuration of the imaging lens according to the first or the third embodiment. The imaging lens according to the third embodiment may have a part of a configuration of the imaging lens according to the first or the second embodiment.

Next, preferred configurations of the imaging lenses according to the foregoing first to the third embodiments of the present disclosure will be given and operational advantages thereof will be described. A preferred aspect may have any one or any combination of two or more of the following configurations.

$$1.0<f2/f \quad (4)$$

$$1.0<f4/f \quad (5)$$

$$0.15<vd4/vd5<3.0 \quad (6)$$

$$1.5<f34/f<5.0 \quad (7)$$

$$0.3<vd1/vd2<2.5 \quad (8)$$

$$2.0<L/f<10.0 \quad (9)$$

$$0.2<Bf/f<2.0 \quad (10)$$

$$0.2<f45/f<3.0 \quad (11)$$

$$1.5<f56/f<7.5 \quad (12)$$

where:
f2 is the focal length of the second lens L2;
f4 is the focal length of the fourth lens L4;
f34 is the combined focal length of the third lens L3 and the fourth lens L4;
f45 is the combined focal length of the fourth lens and the fifth lens;
f56 is the combined focal length of the fifth lens and the sixth lens;
f is the focal length of the entire system;
vd1 is the Abbe number of the material of the first lens with respect to the d-line;
vd2 is the Abbe number of the material of the second lens with respect to the d-line;
vd4 is the Abbe number of the material of the fourth lens with respect to the d-line;
vd5 is the Abbe number of the material of the fifth lens with respect to the d-line;
L is the distance from the object side surface of the first lens to the image plane (air equivalent length for the back focus portion); and
Bf is the distance from the image side surface of the most image side lens to the image sensor (back focus, air equivalent length).

Satisfying the lower limit of the conditional expression (4) allows the power of the second lens L2 to be prevented from increasing excessively, whereby it is easy to suppress error sensitivity due to eccentricity.

Satisfying the lower limit of the conditional expression (5) makes it easy to prevent the power of the fourth lens L4 from increasing excessively, whereby it is easy to suppress the error sensitivity due to eccentricity or to correct spherical aberration.

Satisfying the upper limit of the conditional expression (6) makes it easy to increase the Abbe number of the material of the fifth lens L5 with respect to the d-line, whereby it is easy to suppress longitudinal chromatic aberration and lateral chromatic aberration. Satisfying the lower limit of the conditional expression (6) makes it easy to increase the Abbe number of the material of the fourth lens L4 with respect to the d-line, whereby it is easy to suppress longitudinal chromatic aberration and lateral chromatic aberration.

Satisfying the upper limit of the conditional expression (7) makes it easy to prevent the combined power of the third lens L3 and the fourth lens L4 from decreasing in positive, whereby it is easy to correct spherical aberration. Satisfying the lower limit of the conditional expression (7) makes it easy to prevent the combined power of the third lens L3 and the fourth lens L4 from increasing, whereby it is easy to correct field curvature.

Satisfying the upper limit of the conditional expression (8) makes it easy to prevent the Abbe number of the material of the second lens L2 with respect to the d-line from decreasing excessively, whereby it is easy to correct longitudinal chromatic aberration. Satisfying the lower limit of the conditional expression (8) makes it easy to increase the Abbe number of the material of the first lens L1 with respect to the d-line, whereby it is easy to suppress longitudinal chromatic aberration and lateral chromatic aberration, and makes it easy to reduce the Abbe number of the material of the second lens L2 with respect to the d-line to be, whereby it is easy to suppress lateral chromatic aberration.

Satisfying the upper limit of the conditional expression (9) makes it easy to downsize the lens system or to increase the angle of view. Satisfying the lower limit of the conditional expression (9) makes it easy to increase the thickness of each lens, whereby it is easy to process and assemble the lenses.

Satisfying the upper limit of the conditional expression (10) makes it easy to suppress the back focus, whereby it is easy to downsize the lens system. Satisfying the lower limit of the conditional expression (10) makes it easy to increase the back focus, whereby it is easy to dispose various filters and a cover glass between the lens system and the image plane.

Satisfying the upper limit of the conditional expression (11) makes it easy to prevent the combined power of the fourth lens L4 and the fifth lens L5 from decreasing excessively in positive, whereby it is easy to correct spherical aberration. Satisfying the lower limit of the conditional expression (11) makes it easy to prevent the combined power of the fourth lens L4 and the fifth lens L5 from increasing excessively in positive, whereby it is easy to ensure the back focus.

Satisfying the upper limit of the conditional expression (12) makes it easy to prevent the power of the sixth lens L6 from increasing, whereby it is easy to suppress the angle of a ray incident on the image sensor, or makes it is easy to prevent the power of the fifth lens L5 from decreasing, whereby it is easy to correct spherical aberration. Satisfying the lower limit of the conditional expression (12) makes it easy to prevent the power of the sixth lens L6 from decreasing, whereby it is easy to correct lateral chromatic aberration, or makes it easy to prevent the power of the fifth lens L5 from increasing excessively, whereby it is easy to correct spherical aberration or to ensure the back focus.

In order to enhance the foregoing operational advantages, the imaging lenses preferably satisfy each conditional expression described above with a new upper limit or lower limit added thereto or a modified upper limit or lower limit as in the following manner. Preferred aspects include that a conditional expression formed by combining a modified value of the lower limit and a modified value of the upper limit is satisfied. Preferred modifications of the conditional expressions will be given below as examples, but modifications of the conditional expressions are not limited to those given below and may include a modification formed by combining the modified values describe below.

The upper limit of the conditional expression (1) is more preferably set to 5.0, which makes it easier to increase the power of the third lens L3, whereby it is easier to correct longitudinal chromatic aberration. The upper limit of the conditional expression (1) is preferably set to 4.2, more preferably set to 3.3, further preferably set to 2.2, and further more preferably set to 2.0. The lower limit of the conditional expression (1) is preferably set to 1.4, which makes it easier to correct spherical aberration and field curvature. The lower limit of the conditional expression (1) is more preferably set to 1.5, and further preferably set to 1.6. From the foregoing, it is more preferable that, for example, conditional expressions (1-1) to (1-6) given below are satisfied.

$$1.35 < (R3F + R3R)/(R3F - R3R) < 2.20 \quad (1\text{-}1)$$

$$1.35 < (R3F + R3R)/(R3F - R3R) < 3.3 \quad (1\text{-}2)$$

$$1.4 < (R3F + R3R)/(R3F - R3R) < 2.20 \quad (1\text{-}3)$$

$$1.35 < (R3F + R3R)/(R3F - R3R) < 6.0 \quad (1\text{-}4)$$

$$1.35 < (R3F + R3R)/(R3F - R3R) < 4.2 \quad (1\text{-}5)$$

$$1.5 < (R3F + R3R)/(R3F - R3R) < 2.0 \quad (1\text{-}6)$$

The upper limit of the conditional expression (2) is preferably set to 25, which makes it easier to reduce the Abbe number of the material of the third lens L3 with respect to the d-line, whereby it is easier to correct longitudinal chromatic aberration. The upper limit of the conditional expression (2) is more preferably set to 22, and further preferably set to 20. From the foregoing, it is more preferable that, for example, conditional expressions (2-1) to (2-3) given below are satisfied.

$$vd3 < 25.0 \quad (2\text{-}1)$$

$$vd3 < 20.0 \quad (2\text{-}2)$$

$$vd3 < 19.0 \quad (2\text{-}3)$$

The upper limit of the conditional expression (3) is preferably set to −1.6, which makes it easier to correct spherical aberration and field curvature. The upper limit of the conditional expression (3) is more preferably set to −1.8, and further preferably set to −1.9. The conditional expression (3) preferable has a lower limit, which is preferably set to −10. This makes it easier to increase the power of the third lens L3, whereby it is easier to correct longitudinal chromatic aberration. The lower limit of the conditional expression (3) is preferably set to −5, more preferably set to −4, and further preferably set to −3.8. From the foregoing, it is more preferable that, for example, conditional expressions (3-1) to (3-5) given below are satisfied.

$$f3/f < -1.6 \quad (3\text{-}1)$$

$$f3/f < -1.8 \quad (3\text{-}2)$$

$$-10 < f3/f < -1.4 \quad (3\text{-}3)$$

$$-5 < f3/f < -1.6 \quad (3\text{-}4)$$

$$-4 < f3/f < -1.8 \quad (3\text{-}5)$$

The lower limit of the conditional expression (4) is preferably set to 1.1, which allows the power of the second lens L2 to be prevented from increasing excessively, whereby it is easier to correct error sensitivity due to eccentricity. The lower limit of the conditional expression (4) is preferably set to 1.2, and more preferably set to 1.3. The conditional expression (4) preferably has an upper limit, which is preferably set to 10.0. This makes it easy to increase the power of the second lens L2, whereby it is easy to correct field curvature. The upper limit of the conditional expression (4) is preferably set to 8.0, more preferably set to 6.0, further preferably set to 5.0, and further more preferably set to 4.0. From the foregoing, it is more preferable that, for example, conditional expressions (4-1) to (4-4) given below are satisfied.

$$1.0 < f2/f < 8.0 \quad (4\text{-}1)$$

$$1.1 < f2/f < 6.0 \quad (4\text{-}2)$$

$$1.2 < f2/f < 5.0 \quad (4\text{-}3)$$

$$1.1 < f2/f < 4.0 \quad (4\text{-}4)$$

The lower limit of the conditional expression (5) is preferably set to 1.1, which allows the power of the fourth lens L4 to be further prevented from increasing excessively, whereby it is easier to suppress error sensitivity due to eccentricity, and makes it easier to suppress the power of the fourth lens L4, whereby it is easier to correct spherical aberration. The lower limit of the conditional expression (5) is more preferably set to 1.2, and further preferably set to 1.3. The conditional expression (5) preferably has an upper limit, which is preferably set to 7.0. This makes it easy to correct spherical aberration and field curvature. The upper limit of the conditional expression (5) is preferably set to 5.0, more preferably set to 4.1, further preferably set to 3.3, and further more preferably set to 2.1. From the foregoing, it is more preferable that, for example, conditional expressions (5-1) to (5-4) given below are satisfied.

$$1.0 < f4/f < 7.0 \tag{5-1}$$

$$1.1 \leq f4/f < 5.0 \tag{5-2}$$

$$1.2 \leq f4/f < 5.0 \tag{5-3}$$

$$1.1 \leq f4/f < 3.3 \tag{5-4}$$

The upper limit of the conditional expression (6) is preferably set to 2.0, which makes it easier to increase the Abbe number of the material of the fifth lens L5 with respect to the d-line, whereby it is easier to correct longitudinal chromatic aberration and lateral chromatic aberration. The upper limit of the conditional expression (6) is more preferably set to 1.0, and further preferably set to 0.9. The lower limit of the conditional expression (6) is preferably set to 0.2, which makes it easier to prevent the Abbe number of the material of the fourth lens L4 with respect to the d-line from decreasing, whereby it is easier to suppress longitudinal chromatic aberration and lateral chromatic aberration. The lower limit of the conditional expression (6) is more preferably set to 0.4, and further preferably set to 0.5. From the foregoing, it is more preferable that, for example, conditional expressions (6-1) to (6-4) given below are satisfied.

$$0.2 < vd4/vd5 < 2.0 \tag{6-1}$$

$$0.4 < vd4/vd5 < 1.0 \tag{6-2}$$

$$0.5 < vd4/vd5 < 1.0 \tag{6-3}$$

$$0.5 < vd4/vd5 < 0.9 \tag{6-4}$$

The upper limit of the conditional expression (7) is preferably set to 4.7, which makes it easier to prevent the combined power of the third lens L3 and the fourth lens L4 from decreasing, whereby it is easier to correct spherical aberration. The upper limit of the conditional expression (7) is more preferably set to 4.2, and further preferably set to 3.9. The lower limit of the conditional expression (7) is preferably set to 1.7, which makes it easier to prevent the combined power of the third lens L3 and the fourth lens L4 from increasing, whereby it is easier to suppress field curvature. The lower limit of the conditional expression (7) is more preferably set to 1.8, and further preferably set to 1.9. From the foregoing, it is more preferable that, for example, conditional expressions (7-1) to (7-4) given below are satisfied.

$$1.7 < f34/f < 4.7 \tag{7-1}$$

$$1.8 \leq f34/f < 4.2 \tag{7-2}$$

$$1.8 \leq f34/f < 3.9 \tag{7-3}$$

$$1.9 \leq f34/f < 3.9 \tag{7-4}$$

The upper limit of the conditional expression (8) is preferably set to 2.2, which makes it easier to prevent the Abbe number of the material of the second lens L2 with respect to the d-line from decreasing excessively, whereby it is easier to correct longitudinal chromatic aberration. The upper limit of the conditional expression (8) is more preferably set to 1.8, and further preferably set to 1.5. The lower limit of the conditional expression (8) is preferably set to 0.4, which makes it easier to increase the Abbe number of the material of the first lens L1 with respect to the d-line, whereby it is easier to suppress longitudinal chromatic aberration and lateral chromatic aberration, or makes it easier to reduce the Abbe number of the material of the second lens L2 with respect to the d-line to, whereby it is easier to suppress lateral chromatic aberration. The lower limit of the conditional expression (8) is more preferably set to 0.6. From the foregoing, it is more preferably, for example, that conditional expressions (8-1) to (8-3) given below are satisfied.

$$0.4 < vd1/vd2 < 2.0 \tag{8-1}$$

$$0.4 < vd1/vd2 < 1.8 \tag{8-2}$$

$$0.6 < vd1/vd2 < 1.5 \tag{8-3}$$

The upper limit of the conditional expression is preferably set to 9.0, which makes it easier to downsize the lens system or to increase the angle of view. The upper limit of the conditional expression (9) is more preferably set to 7.0, and further preferably set to 6.0. The lower limit of the conditional expression (9) is preferably set to 2.5, which makes it easier to increase the thickness of each lens, whereby it is easier to process and assemble the lenses. The lower limit of the conditional expression (9) is more preferably set to 3.0. From the foregoing, it is more preferable that, for example, conditional expressions (9-1) to (9-3) given below are satisfied.

$$2.5 < L/f < 9.0 \tag{9-1}$$

$$2.5 < L/f < 7.0 \tag{9-2}$$

$$3.0 < L/f < 6.0 \tag{9-3}$$

The upper limit of the conditional expression (10) is preferably set to 1.8, which makes it easier to suppress the back focus, whereby it is easier to downsize the lens system. The upper limit of the conditional expression is more preferably set to 1.6, and further preferably set to 1.4. The lower limit of the conditional expression (10) is preferably set to 0.3, which makes it easier to increase the back focus, whereby it is easier to dispose various filters and a cover glass between the lens system and the image plane. The lower limit of the conditional expression (10) is preferably set to 0.4. From the foregoing, it is more preferable that, for example, conditional expressions (10-1) to (10-3) given below are satisfied.

$$0.3 < Bf/f < 1.8 \tag{10-1}$$

$$0.3 < Bf/f < 1.6 \tag{10-2}$$

$$0.4 < Bf/f < 1.4 \tag{10-3}$$

The upper limit of the conditional expression (11) is preferably set to 2.2, which makes it easier to prevent the combined power of the fourth lens L4 and the fifth lens L5 from decreasing excessively, whereby it is easier to correct spherical aberration, or it is easier to correct lateral chromatic aberration. The upper limit of the conditional expression (11) is more preferably set to 1.6, and further preferably set to 1.3. The lower limit of the conditional expression (11) is preferably set to 0.3, which makes it easier to prevent the combined power of the fourth lens L4 and the fifth lens L5 from increasing excessively, whereby it is easier to ensure the back focus. The lower limit of the conditional expression (11) is preferably set to 0.4. From the foregoing, it is more preferable that, for example, conditional expressions (11-1) to (11-4) given below are satisfied.

$$0.2 < f45/f < 2.2 \quad (11\text{-}1)$$

$$0.3 < f45/f < 1.6 \quad (11\text{-}2)$$

$$0.3 < f45/f < 1.3 \quad (11\text{-}3)$$

$$0.4 < f45/f < 1.3 \quad (11\text{-}4)$$

The upper limit of the conditional expression is preferably set to 6.0, which makes it easier to prevent the power of the sixth lens L6 from increasing, whereby it is easier to suppress the angle of a ray incident on the image sensor or makes it easier to prevent the power of the fifth lens L5 from decreasing, whereby it is easier to correct spherical aberration. The upper limit of the conditional expression (12) is more preferably set to 5.5, and further preferably set to 5.0. The lower limit of the conditional expression (12) is preferably set to 2.0, which makes it easier to prevent the power of the sixth lens L6 from decreasing, whereby it is easier to correct lateral chromatic aberration, or makes it easier to prevent the power of the fifth lens L5 from increasing excessively, whereby it is easier to correct spherical aberration or to ensure the back focus. The lower limit of the conditional expression (12) is more preferably set to 2.2, and further preferably set to 2.5. From the foregoing, it is more preferable that, for example, conditional expressions (12-1) to (12-3) given below are satisfied.

$$2.0 < f56/f < 6.0 \quad (12\text{-}1)$$

$$2.2 < f56/f < 5.5 \quad (12\text{-}2)$$

$$2.5 < f56/f < 5.0 \quad (12\text{-}3)$$

A material having a negative temperature coefficient of refractive-index, dn/dt is preferably used for a lens having a positive power in the lens system. This makes it easy to suppress a focusing shift due to a temperature change. The material having a negative temperature coefficient of refractive index, dn/dt may be used only for one lens or for a plurality of lenses.

Specific materials having a negative temperature coefficient of refractive index, dn/dt which may be preferably used include S-PHM52, S-PHM53, S-FPM2, S-FPM 3, and S-FPL51 of OHARA, Inc. This makes it easy to suppress focusing shift due to a temperature change. Other materials having a negative temperature coefficient of refractive index, dn/dt which may also be used include PCD4 and FCD505 of HOYA Corporation, and H-ZPK1 of CDGM Glass Co., Ltd.

For the materials having a negative temperature coefficient of refractive index dn/dt of HOYA Corporation, materials having a negative temperature coefficient of the refractive index with respect to a wavelength of 632.8 nm (He—Ne laser) are preferably used. For the materials of OHARA Inc., CDGM Glass Co., Ltd, SUMITA OPTICAL GLASS Inc., etc., materials having a negative temperature coefficient of the refractive index with respect to the d-line are preferably used.

A material having a negative temperature coefficient of refractive-index dn/dt is preferably used for the second lens L2.

A material having a negative temperature coefficient of refractive-index dn/dt is preferably used for the fourth lens L4.

A material having a negative temperature coefficient of refractive-index dn/dt is preferably used for the fifth lens L5.

The Abbe number of the material of the first lens L1 with respect to the d-line is preferably greater than or equal to 40, which allows longitudinal chromatic aberration and lateral chromatic aberration to be corrected satisfactorily. Further, greater than or equal to 45 is more preferable.

The Abbe number of the material of the second lens L2 with respect to the d-line is preferably greater than or equal to 25, which allows longitudinal chromatic aberration to be corrected satisfactorily. Further, greater than or equal to 28 is more preferable.

The Abbe number of the material of the second lens L2 with respect to the d-line is preferably less than or equal to 70, which allows the use of an inexpensive material for the second lens L2 or makes it easy to correct lateral chromatic aberration satisfactorily.

The Abbe number of the material of the third lens L3 with respect to the d-line is preferably less than or equal to 30, which allows longitudinal chromatic aberration to be corrected satisfactorily. Further, less than or equal to 28 is more preferable, and less than or equal to 20 is further preferable.

The Abbe number of the material of the fourth lens L4 with respect to the d-line is preferably greater than or equal to 35, which allows longitudinal chromatic aberration and lateral chromatic aberration to be corrected satisfactorily.

The Abbe number of the material of the fifth lens L5 with respect to the d-line is preferably greater than or equal to 40, which allows longitudinal chromatic aberration and lateral chromatic aberration to be corrected satisfactorily. Further, greater than or equal to 50 is more preferable, and greater than or equal to 60 is further preferable.

The Abbe number of the material of the sixth lens L6 with respect to the d-line is preferably less than or equal to 30, which allows longitudinal chromatic aberration and lateral chromatic aberration to be corrected satisfactorily. Further, less than or equal to 25 is more preferable, and greater than or equal to 20 is further preferable.

The aperture stop refers to a stop that determines the F-number (Fno) of a lens system, and the aperture stop is preferably disposed on the object side of the fifth lens L5. The term "the aperture stop is disposed on the object side of the fifth lens L5" refers to that the center (position on the optical axis) of the aperture stop is located on the object side of the image side surface of the fifth lens L5. Disposing the aperture stop on the object side of the fifth lens L5 makes it easy to reduce the opening size of the first lens L1, whereby it is easy to reduce the lens diameter. For example, in a case where the imaging lens of the present embodiment is used in a vehicle camera, only a small portion of the lens is allowed to be exposed to the outside in order not to impair the appearance. The disposition of the aperture stop on the object side of the fifth lens L5 makes it easy to reduce the opening size of the first lens L1, whereby it is easy to reduce a portion of the lens exposed to the outside. Further, this makes it easy to suppress the angle of a ray incident on the image sensor, whereby it is easy to suppress shading.

The aperture stop is preferably disposed on the object side of the image side surface of the fourth lens L4. This makes it easier to reduce a portion of the lens exposed to the outside and to suppress shading.

The aperture stop is preferably disposed on the image side of the object side surface of the first lens L1. This allows the diameters of the sixth lens L6 and the first lens L1 to be balanced, whereby it is easy to downsize the entire lens diameter.

The aperture stop is preferably disposed between the second lens L2 and the third lens L3 or between the third lens L3 and the fourth lens L4 to reduce the portion to be exposed to the outside and the diameter of the entire lens system in a well-balanced manner.

Each of the first lens L1 to the sixth lens L6 may have an aspherical surface on either one of the sides. This allows various types of aberrations to be corrected satisfactorily.

The second lens L2 preferably has an aspherical surface on at least one side. Arranging an aspherical surface on at least one side of the second lens L2 makes it easy to correct field curvature and spherical aberration, whereby good resolution performance is obtained. The second lens L2 more preferably has aspherical surfaces on both sides.

A judgement is made as to whether an aspherical surface has "a convex surface" or "a concave surface" in the paraxial region. The power at a point on an aspherical surface other than the paraxial region is judged by considering a surface normal at the point, assuming the length from the point to the intersection point between the normal and the optical axis to be the radius of curvature, and comparing the absolute value of the length with the absolute value of the paraxial radius of curvature. If the absolute value of the radius of curvature of a point on an aspherical surface is greater than the absolute value of the paraxial radius of curvature, the power at the point is determined to be smaller (weaker) than that of the paraxial region, while if the absolute value of the radius of curvature of a point on an aspherical surface is smaller than the absolute value of the paraxial radius of curvature, the power at the point is greater (stronger) than that of the paraxial region.

A judgement is made as to whether an aspherical surface has "a convex surface (positive power)" or "a concave surface (negative power)" at a point other than the paraxial region by considering a surface normal at the point, and determining on which side of the intersection point between the surface and the optical axis the intersection point between the normal and the optical axis is located. In a case where the surface is an object side surface, if the intersection point between the normal and the optical axis is located on the image side of the intersection point between the surface and the optical axis, it is judged as a convex surface (positive power), while if he intersection point between the normal and the optical axis is located on the object side of the intersection point between the surface and the optical axis, it is judged as a concave surface (negative power). In a case where the surface is an image side surface, if the intersection point between the normal and the optical axis is located on the object side of the intersection point between the surface and the optical axis, it is judged as a convex surface (positive power), while if the intersection point between the normal and the optical axis is located on the image side of the intersection point between the surface and the optical axis, it is judged as a concave surface (negative power).

The term "effective diameter of a surface" refers to the diameter of a circle formed of outermost points in a diameter direction (points most remote from the optical axis) when intersection points of all rays contributing to imaging with the lens surface are considered, and the term "effective diameter ends" refers to the outer most points. Note that the graphical figure formed of the foregoing outermost points is a circle in a rotationally symmetrical system with respect to the optical axis, but the graphical figure may not be a circle in a system not rotationally symmetric. In such a case, an equivalent circle may be assumed and the diameter of the circle may be used as the effective diameter.

The object side surface of the second lens L2 preferably has a shape in which both the center (paraxial region) and the effective diameter ends have positive powers, and the positive power at the effective diameter ends is weak in comparison with that of the center. Shaping the object side surface of the second lens L2 in such shape makes it easy to correct field curvature and spherical aberration satisfactorily.

The image side surface of the second lens L2 preferably has a shape in which both the center and the effective diameter ends have positive powers, and the positive power at the effective diameter ends is weak in comparison with that of the center. Shaping the image side surface of the second lens L2 in such shape makes it easy to correct field curvature and spherical aberration satisfactorily.

The fourth lens L4 preferably has an aspherical surface on at least one side. Arranging an aspherical surface on at least one side of the fourth lens L4 makes it easy to correct field curvature and spherical aberration, whereby good resolution performance is obtained. The fourth lens L4 more preferably has aspherical surfaces on both sides.

The object side surface of the fourth lens L4 preferably has a shape in which the paraxial region is a planar surface and the effective diameter ends have a concave surface, or a shape in which both the center and the effective diameter ends have negative powers and the negative power at the effective diameter ends is strong in comparison with that of the center. Shaping the object side surface of the fourth lens L4 in such shape makes it easy to correct field curvature and spherical aberration satisfactorily.

The image side surface of the fourth lens L4 preferably has a shape in which both the center and the effective diameter ends have positive powers, and the positive power at the effective diameter ends is strong in comparison with that of the center. Shaping the image side surface of the fourth lens L4 in such shape makes it easy to correct field curvature and spherical aberration satisfactorily.

The first lens L1 preferably has a convex surface on the object side. This makes it easy to correct field curvature and coma aberration satisfactorily.

The first lens L1 preferably has a meniscus shape with a convex surface on the object side. This makes it easy to correct field curvature and coma aberration satisfactorily, as well as distortion.

The second lens L2 preferably has a biconvex shape. This makes it easy to increase the power of the second lens L2, whereby it is easy to correct spherical aberration and field curvature.

The third lens L3 preferably has a meniscus shape with a convex surface on the object side or a plano-convex shape. This makes it easy to correct field curvature.

The fourth lens L4 preferably has a convex surface on the image side. This makes it easy to correct field curvature.

The fourth lens L4 preferably has a meniscus shape with a convex surface on the image side or a plano-convex shape with a convex surface on the image side. This makes it easy to correct field curvature.

The fifth lens L5 preferably has a biconvex shape. This allows the power of the fifth lens L5 to be increased, whereby it is easy to correct spherical aberration and field curvature, and further it is easy to correct lateral chromatic aberration between the fifth lens L5 and the sixth lens L6.

The sixth lens L6 preferably has a meniscus shape with a concave surface on the object side or a plano-concave shape with a concave surface on the object side. This makes it easy to correct field curvature and coma aberration or to suppress the angle of a ray incident on the image sensor.

The material of the first lens L1 is preferably glass. For example, in a case where the imaging lens is used in severe environments such as, for example, in a vehicle camera or in a surveillance camera, a material which is resistant to surface degradation by wind and rain, temperature change by direct sunlight, and chemicals, such as grease, detergent, and the like, that is, a material which is highly resistant to moistures, weathers, acids, chemicals, and the like is required for the first lens L1 which is disposed on the most object side. Further, the use of a hard and less breakable material may sometimes be required. These requirements may be satisfied by the used of glass as the material of the first lens L1. Further, transparent ceramics may be used as the material of the first lens L1.

A protection means for enhancing strength, scratch resistance, and chemical resistance may be provided on the object side surface of the first lens L1 and if that is the case, the material of the first lens L1 may be plastic. Such protection means may be a hard coating or a water repellent coating.

For example, in a vehicle camera lens, lenses are required to withstand various shocks. Thus, the first lens L1 is preferably thick, and the center thickness of the first lens L1 is preferably greater than or equal to 0.5 mm.

In order to produce a high environment resistant optical system, materials of all of the lenses are preferably glass. For example, if used in a surveillance camera or in a vehicle camera, the optical system may possibly be used under various conditions such as, for example, under a wide temperature range from a low temperature to a high temperature, or under high humidity. In order to make an optical system highly resistant to these conditions, all the lenses are preferably made of glass.

The material of any one or any combination of two or more of the first lens L1 to the sixth lens L6 is preferably plastic. The use of the plastic as the material makes it easy to reduce the cost and weight of the lens system, and allows an aspherical surface to be formed inexpensively and accurately, thereby allowing spherical aberration and field curvature to be corrected satisfactorily.

In order to produce a lens system which is resistant to temperature changes, the lens system preferably includes a plastic lens of a positive power and a plastic lens of a negative power. Generally, properties of plastic lenses change largely due to temperature changes, thereby causing a focus shift. But, inclusion of the positive power plastic lens and the negative power plastic lens in the lens system may cancel the power change and may minimize performance degradation.

Plastic materials which may be used include, for example, acrylic series and polyolefin series materials, polycarbonate series materials, epoxy resins, polyethylene terephthalate (PET), poly ether sulfone (PES), and the like.

Depending on the intended use of the imaging lens 1, a filter that cuts ultraviolet light to blue light, or an infrared (IR) filter that cuts infrared light may be inserted between the lens system and the image sensor 5. Otherwise, a coating having identical characteristics to those of the filter described above may be applied to a lens surface. Further, a material that absorbs ultraviolet light, blue light, infrared light, or the like may be used as the material of any of the lenses.

FIG. 1 shows an example in which an optical member PP which assumes various filters and the like is disposed between the lens system and the image sensor 5, but instead of this, various filters may be disposed between each lens. Otherwise, a coating having identical effects to those of various filters may be applied to a lens surface of any lens of the imaging lens.

Note that a light beam passing the outside of the effective diameter between each lens may reach the image plane as stray light and may cause a ghost image. Therefore, a light shielding means that shields the stray light is preferably provided. The light shielding means may be, for example, an opaque coating material or an opaque plate material applied to a portion outside the effective diameter of a lens. Otherwise, an opaque plate material may be provided, as the shielding means, in the optical path of the light beam resulting in stray light. Further, a something like a hood may be provided on the object side of the most object side lens for shielding the stray light. A shielding means for cutting light rays passing the outside of the effective diameter is preferably disposed, for example, between the first lens L1 and the second lens L2, or between the fourth lens L4 and the fifth lens L5. Note that the position for providing the shielding means is not limited to this, and the shielding means may be disposed on or between other lenses.

Further, a member such as, for example, a stop that shields marginal rays within a degree that causes no practical problem in relative illumination may be disposed between each lens. The marginal rays refer to light rays of those from an object point off the optical axis Z that pass through a peripheral portion of the entrance pupil of an optical system. Disposing the member for shielding marginal rays in the manner described above may improve the image quality at a peripheral region of the imaging area. Further, shielding the light that generates a ghost image by the member may reduce ghost images.

The lens system is preferably composed of only six lenses, the first lens L1, the second lens L2, the third lens L3, the fourth lens L4, the fifth lens L5, and sixth lens L6. Composing a lens system with only six lenses allows the lens system to be inexpensive.

The imaging apparatus according to the present embodiment may be formed small and inexpensively with a sufficiently wide angle of view, and may obtain a high resolution quality image using an image sensor, as the apparatus is equipped with the imaging lens of the present embodiment.

Further, an image captured by an imaging lens equipped with the imaging lens according to any of the first to the third embodiments may be displayed on a cell phone (including a smartphone). For example, there may be a case in which an imaging apparatus equipped with the imaging lens of the present embodiment is installed on a car as a vehicle camera, then the rear side or around the car is imaged by the vehicle camera, and an image obtained by the imaging is displayed on a display device. In such a case, if the car is equipped with a car navigation system (hereinafter, "car-navigation"), the image obtained by the imaging may be displayed on the display device of the car-navigation, while if the car is not equipped with a car-navigation, a dedicated display device, for example, a liquid crystal display needs to be installed in the car. But, the display device is expensive. In the meantime, recent cell phones are equipped with high performance display devices capable of displaying motion pictures, browsing the Web, and the like. The use of a cell phone as the display device of a vehicle camera may eliminate the need to install a dedicated display device for a car without a car-navigation, thereby allowing the vehicle camera to be installed inexpensively.

Here, the image obtained by the vehicle camera may be transmitted to the cell phone by wire transmission using a cable or the like, or by wireless transmission such as infrared communication or the like. Further, an arrangement may be adopted in which an image of the vehicle camera may be displayed automatically on the display device of the cell phone when, for example, the gear of the car is shifted to the rear position or a turn signal is given by associating the cell phone with the operation state of the car.

As for the display device for displaying an image of the vehicle camera, not only the cell phone but also a handheld terminal, such as a PDA, a tablet terminal, a small personal computer, or a small portable car-navigation may be used.

Further, a cell phone equipped with an imaging lens of the present disclosure may be fixed to a car and used as a vehicle camera. As recent smartphones have processing powers comparable to those of personal computers, a camera of a cell phone may be used in the same manner as a vehicle camera by fixing the cell phone, for example, to a dashboard of a car and orienting the camera to the front side. As an application of the smartphone, a function that recognizes a white line or a road sign and issues a warning may be provided. Further, the smartphone may be used as a warning system in which the camera is directed to the driver and a warning is issued when the driver is drowsy or inattentive. Still further, the smartphone may be associated with a car and used as a part of the wheel steering system of the car. As a car is exposed to high and low temperature environments, a vehicle camera is required to have strict environment resistance. In a case where the imaging lens of the present disclosure is installed in a cell phone, the cell phone is brought outside the car with the driver other than during the driving, so that the environment resistance of the imaging lens may be relaxed, whereby a vehicle-installed system may be introduced inexpensively.

[Numerical Examples of Imaging Lens]

Next, numerical examples of the imaging lens of the present disclosure will be described. Lens cross-sectional views of imaging lenses of Example 1 to Example 6 are shown in FIGS. 2 to 7 respectively. In FIGS. 2 to 7, the left side of the drawing is the object side and the right side is the image side, and the aperture stop St, the optical member PP, and the image sensor 5 disposed on the image plane Sim are also indicated as in FIG. 1. The aperture stop St shown in each drawing does not represent the size or the shape but indicates the position on the optical axis Z. In each example, the symbols Ri and Di (i=1, 2, 3, - - - ) in the lens cross-sectional view correspond to Ri and Di in the lens data to be described herein below.

Tables 1 to 6 show lens data of imaging lenses of Examples 1 to 6 respectively. Basic lens data are shown in (A) of each table, various types of data are shown in (B), and aspherical surface data are shown (C) for those which include an aspherical surface shape.

In the basic lens data, the Si column indicates $i^{th}$ surface number in which a number i (i=1, 2, 3, - - - ) is given to each surface in a serially increasing manner toward the image side with the object side surface of the most object side constituent element being taken as the first surface. The Ri column indicates the radius of curvature of $i^{th}$ surface and the Di column indicates the surface distance on the optical axis Z between $i^{th}$ surface and $(i+1)^{th}$ surface. The sign of the radius of curvature is positive if the surface shape is convex on the object side and negative if it is convex on the image side. The Ndj column indicates the refractive index of $j^{th}$ optical element with respect to the d-line (wavelength of 587.6 nm) in which a number j (j=1, 2, 3, - - - ) is given to each optical element in a serially increasing manner toward the image side and the vdj column indicates the Abbe number of $j^{th}$ optical element with respect to the d-line. Note that the basic lens data also include the aperture stop St and the optical member PP. The terms of (St) and (IMG) are included in the rows of the surface number column corresponding to the aperture stop St and image plane Sim respectively in addition to the surface numbers.

In the basic lens data, the mark * is attached to the surface number of an aspherical surface and a numerical value of the paraxial radius of curvature (radius of curvature of the center) is indicated as the radius of curvature of the aspherical surface. The aspherical surface coefficient table indicates the surface numbers of aspherical surfaces and aspherical surface coefficients of each aspherical surface. The numerical value "E−n" (n: integer) in an aspherical surface coefficient refers to "×10$^{-n}$" and "E+n" refers to "×10$^{n}$". The aspherical surface coefficients are the values of each of coefficients KA and RBm (m=3, 4, 5, - - - , and 20) in an aspherical surface expression represented by a formula given below.

$$Zd = C \cdot h^2 / \{1 + (1 - KA \cdot C^2 \cdot h^2)^{1/2}\} + \Sigma RBm \cdot h^m$$

where,

Zd is the depth of aspheric surface (length of vertical line from a point on the aspheric surface at a height h to a flat surface orthogonal to the optical axis to which the aspherical surface vertex contacts), h is the height (distance from the optical axis to lens surface), C is the inverse of the paraxial radius of curvature, and KA, RBm are the aspherical surface coefficients (m=3, 4, 5, - - - , and 20).

In the various types of data, L(in Air) represents the distance on the optical axis Z from the object side surface of the first lens L1 to the image plane Sim (air equivalent length for the back focus portion), Bf (in Air) represents the distance on the optical axis Z from the image side surface of the most image side lens to the image plane Sim (corresponding to the back focus in terms of air equivalent length), f represents the focal length of the entire system, f2 represents the focal length of the second lens L2, f3 represents the focal length of the third lens L3, f4 represents the focal length of the fourth lens L4, f34 represents the combined focal length of the third lens L3 and the fourth lens L4, f45 represents the combined focal length of the fourth lens L4 and the fifth lens L5, and f56 represents the combined focal length of the fifth lens L5 and the sixth lens L6.

Values of the imaging lens of each example corresponding to the conditional expressions (1) to (12) are shown in Table 7. The conditional expression (1) is (R3F+R3R)/(R3F−R3R), the conditional expression (2) is vd3, the conditional expression (3) is f3/f, the conditional expression (4) is f2/f, the conditional expression (5) is f4/f, the conditional expression (6) is vd4/vd5, the conditional expression (7) is f34/f, the conditional expression (8) is vd1/vd2, the conditional expression (9) is L/f, the conditional expression (10) is Bf/f, the conditional expression (11) is f45/f, and the conditional expression (12) is f56/f where:

R3F is the radius of curvature of the object side surface of the third lens;

R3R is the radius of curvature of the image side surface of the third lens;

f2 is the focal length of the second lens;

f4 is the focal length of the fourth lens;

f34 is the combined focal length of the third lens and the fourth lens;

f45 is the combined focal length of the fourth lens and the fifth lens;
f56 is the combined focal length of the fifth lens and the sixth lens;
f is the focal length of the entire system;
vd1 is the Abbe number of the material of the first lens L1 with respect to the d-line;
vd2 is the Abbe number of the material of the second lens L2 with respect to the d-line;
vd3 is the Abbe number of the material of the third lens L3 with respect to the d-line;
vd4 is the Abbe number of the material of the fourth lens L4 with respect to the d-line;
vd5 is the Abbe number of the material of the fifth lens L5 with respect to the d-line;
L is the distance from the object side surface of the first lens L1 to the image plane; and
Bf is the distance from the image side surface of the most image side lens to the image sensor (back focus).

As the unit of each numerical value, "mm" is used for length. But, this is only an example and other appropriate units may also be used, because an optical system is usable even when proportionally enlarged or reduced.

TABLE 1

Example 1

(A)

| Si | Ri | Di | Ndj | vdj | Material Name |
|---|---|---|---|---|---|
| 1 | 12.3645 | 1.50001 | 1.7725 | 49.6 | S-LAH66 |
| 2 | 2.8412 | 1.70000 | | | |
| 3 | 19.8425 | 2.73472 | 1.8830 | 40.8 | S-LAH58 |
| 4 | −8.5729 | 0.25002 | | | |
| 5(St) | ∞ | 1.29780 | | | |
| 6 | 24.9302 | 0.80000 | 1.9229 | 18.9 | S-NPH2 |
| 7 | 7.1108 | 0.50000 | | | |
| 8 | ∞ | 2.60000 | 1.7725 | 49.6 | S-LAH66 |
| 9 | −5.7288 | 0.10724 | | | |
| 10 | 7.6421 | 3.00000 | 1.6180 | 63.3 | S-PHM52 |
| 11 | −7.6422 | 1.00004 | | | |
| 12 | −7.0265 | 0.80002 | 1.9229 | 18.9 | S-NPH2 |
| 13 | −49.9721 | 0.50000 | | | |
| 14 | ∞ | 0.40000 | 1.5168 | 64.2 | BSC7 |
| 15 | ∞ | 2.49157 | | | |
| IMG | | | | | |

TABLE 1-continued

Example 1

(B)

| | |
|---|---|
| L(in Air) | 19.5 |
| Bf(in Air) | 3.3 |
| f | 4.21 |
| f2 | 7.10 |
| f3 | −11.02 |
| f4 | 7.42 |
| f34 | 15.13 |
| f45 | 3.82 |
| f56 | 14.26 |

TABLE 2

Example 2

(A)

| Si | Ri | Di | Ndj | vdj | Material Name |
|---|---|---|---|---|---|
| 1 | 12.9924 | 1.60000 | 1.9037 | 31.3 | TAFD25 |
| 2 | 3.5934 | 1.49997 | | | |
| 3 | 28.6783 | 2.20000 | 1.9037 | 31.3 | TAFD25 |
| 4 | −8.5038 | 2.86720 | | | |
| 5(St) | ∞ | 0.30000 | | | |
| 6 | 24.0488 | 0.85000 | 1.9229 | 18.9 | S-NPH2 |
| 7 | 7.4118 | 0.40000 | | | |
| 8 | ∞ | 2.25000 | 1.8830 | 40.8 | S-LAH58 |
| 9 | −6.4263 | 0.10724 | | | |
| 10 | 6.5803 | 3.07272 | 1.6180 | 63.3 | S-PHM52 |
| 11 | −6.5869 | 0.80286 | | | |
| 12 | −5.7646 | 0.65000 | 1.9229 | 18.9 | S-NPH2 |
| 13 | −111.3766 | 0.50000 | | | |
| 14 | ∞ | 0.40000 | 1.5168 | 64.2 | BSC7 |
| 15 | ∞ | 2.20577 | | | |
| IMG | | | | | |

(B)

| | |
|---|---|
| L(in Air) | 19.6 |
| Bf(in Air) | 3.0 |
| f | 4.63 |
| f2 | 7.47 |
| f3 | −11.90 |
| f4 | 7.28 |
| f34 | 14.40 |
| f45 | 3.55 |
| f56 | 14.94 |

TABLE 3

Example 3

(A)

| Si | Ri | Di | Ndj | vdj | Material Name |
|---|---|---|---|---|---|
| 1 | 7.6714 | 1.60001 | 1.9037 | 31.3 | TAFD25 |
| 2 | 2.9037 | 1.49997 | | | |
| 3 | 22.7597 | 2.39996 | 1.9037 | 31.3 | TAFD25 |
| 4 | −8.4694 | 0.50000 | | | |
| 5(St) | ∞ | 1.25000 | | | |
| 6 | 22.1520 | 0.98387 | 1.9229 | 18.9 | S-NPH2 |
| 7 | 6.2000 | 0.51000 | | | |
| *8 | ∞ | 2.39997 | 1.8061 | 40.9 | S-LAH53 |
| *9 | −5.1371 | 0.10724 | | | |
| 10 | 6.6027 | 3.10000 | 1.6180 | 633 | S-PHM52 |
| 11 | −6.6027 | 0.80000 | | | |

TABLE 3-continued

Example 3

| Si | Ri | Di | Ndj | vdj | Material Name |
|---|---|---|---|---|---|
| 12 | −5.2467 | 0.70000 | 1.9229 | 18.9 | S-NPH2 |
| 13 | ∞ | 0.50000 | | | |
| 14 | ∞ | 0.40000 | 1.5168 | 64.2 | BSC7 |
| 15 | ∞ | 1.97002 | | | |
| IMG | | | | | |

(B)

| | |
|---|---|
| L(in Air) | 18.6 |
| Bf(in Air) | 2.7 |
| f | 4.64 |
| f2 | 7.09 |
| f3 | −9.61 |
| f4 | 6.37 |
| f34 | 12.57 |
| f45 | 3.37 |
| f56 | 19.98 |

(C)

| Si | K | RB3 | RB4 | RB5 | RB6 |
|---|---|---|---|---|---|
| 8 | 0.0000000E+00 | −1.2696502E−04 | 5.7692717E−04 | 8.5967711E−07 | −2.9631180E−04 |
| 9 | 0.0000000E+00 | 7.5253811E−04 | −1.5523057E−03 | 4.5510611E−04 | −2.3896013E−04 |

TABLE 4

Example 4

(A)

| Si | Ri | Di | Ndj | vdj | Material Name |
|---|---|---|---|---|---|
| 1 | 8.1155 | 1.60000 | 1.9037 | 31.3 | TAFD25 |
| 2 | 3.1192 | 1.49997 | | | |
| 3 | 41.2568 | 2.39996 | 1.9037 | 31.3 | TAFD25 |
| 4 | −8.4159 | 2.17776 | | | |
| 5(St) | ∞ | 0.30000 | | | |
| 6 | 27.2885 | 0.90000 | 1.9229 | 18.9 | S-NPH2 |
| 7 | 7.3729 | 0.40000 | | | |
| 8 | ∞ | 2.40003 | 1.8830 | 40.8 | S-LAH58 |
| 9 | −5.9849 | 0.10724 | | | |
| 10 | 6.7264 | 3.00002 | 1.6180 | 63.3 | S-PHM52 |
| 11 | −6.7149 | 0.80000 | | | |
| 12 | −5.9844 | 0.70000 | 1.9229 | 18.9 | S-NPH2 |
| 13 | ∞ | 2.00000 | | | |
| 14 | ∞ | 0.40000 | 1.5168 | 64.2 | BSC7 |
| 15 | ∞ | 0.60460 | | | |
| IMG | | | | | |

(B)

| | |
|---|---|
| L(in Air) | 19.2 |
| Bf(in Air) | 2.9 |
| f | 4.64 |
| f2 | 7.92 |
| f3 | −11.19 |
| f4 | 6.78 |
| f34 | 12.83 |
| f45 | 3.47 |
| f56 | 16.38 |

TABLE 5

Example 5

(A)

| Si | Ri | Di | Ndj | vdj | Material Name |
|---|---|---|---|---|---|
| 1 | 8.6846 | 1.79993 | 1.7725 | 49.6 | S-LAH66 |
| 2 | 3.0989 | 1.90007 | | | |
| *3 | 15.2582 | 2.20002 | 1.8061 | 40.9 | S-LAH53 |
| *4 | −31.9108 | 0.93962 | | | |
| 5(St) | ∞ | 0.75008 | | | |
| 6 | 33.8540 | 1.16473 | 1.9591 | 17.5 | S-NPH3 |
| 7 | 9.9867 | 0.50176 | | | |
| 8 | −55.0000 | 2.59991 | 1.8830 | 40.8 | S-LAH58 |
| 9 | −6.0861 | 0.10724 | | | |
| 10 | 7.2690 | 4.17639 | 1.6180 | 63.3 | S-PHM52 |
| 11 | −8.2021 | 0.85007 | | | |
| 12 | −7.4959 | 0.85007 | 1.9591 | 17.5 | S-NPH3 |
| 13 | −79.7461 | 0.70000 | | | |
| 14 | ∞ | 0.40000 | 1.5168 | 64.2 | BSC7 |
| 15 | ∞ | 2.64199 | | | |
| IMG | | | | | |

TABLE 5-continued

Example 5

(B)

| | |
|---|---|
| L(in Air) | 21.4 |
| Bf(in Air) | 3.6 |
| f | 4.97 |
| f2 | 13.08 |
| f3 | −15.13 |
| f4 | 7.56 |
| f34 | 12.26 |
| f45 | 3.98 |
| f56 | 14.88 |

(C)

| Si | K | RB3 | RB4 | RB5 | RB6 |
|---|---|---|---|---|---|
| 3 | 1.0000000E+00 | −5.9813455E−05 | −2.1204534E−05 | −2.5874152E−06 | 2.8478921E−07 |
| 4 | 1.0000000E+00 | 3.2449802E−04 | 4.7307619E−05 | −1.3569078E−06 | 6.0244276E−07 |

TABLE 6

Example 6

(A)

| Si | Ri | Di | Ndj | vdj | Material Name |
|---|---|---|---|---|---|
| 1 | 7.6671 | 1.80002 | 1.7550 | 52.3 | S-YGH51 |
| 2 | 2.7956 | 1.35002 | | | |
| 3 | 12.0154 | 2.20002 | 1.6180 | 63.3 | S-PHM52 |
| 4 | −52.0550 | 0.25000 | | | |
| 5(St) | ∞ | 1.32455 | | | |
| 6 | 30.9952 | 1.20002 | 1.9229 | 18.9 | S-NPH2 |
| 7 | 8.9401 | 0.46002 | | | |
| 8 | ∞ | 2.59995 | 1.8830 | 40.8 | S-LAH58 |
| 9 | −5.8769 | 0.10724 | | | |
| 10 | 7.9636 | 3.04999 | 1.6180 | 63.3 | S-PHM52 |
| 11 | −7.9636 | 0.79999 | | | |
| 12 | −8.5429 | 0.85006 | 1.9591 | 17.5 | S-NPH3 |
| 13 | −82.9671 | 0.40000 | | | |
| 14 | ∞ | 0.40000 | 1.5168 | 64.2 | |
| 15 | ∞ | 4.05296 | | | |
| IMG | | | | | |

(B)

| | |
|---|---|
| L(in Air) | 20.7 |
| Bf(in Air) | 4.7 |
| f | 4.98 |
| f2 | 16.01 |
| f3 | −13.98 |
| f4 | 6.66 |
| f34 | 10.45 |
| f45 | 3.71 |
| f56 | 14.46 |

In the foregoing Examples 1 to 6, the lens material is glass. Tables 1 to 6 describe lens material names, but other materials having identical properties may be used. As a lens material, TAFD25 of HOYA Corporation is described, but materials having equivalent properties of other companies may be used. For example, L-LAH86 of OHARA, Inc., H-ZLAF75A of CDGM Glass Co., Ltd, and the like may be used.

Further, as a lens material, S-NPH2 of OHARA, Inc. is described but, for example, H-ZF72A of CDGM Glass Co., Ltd and the like may be used.

Still further, as a lens material, S-LAH58 of OHARA, Inc. is described but TAFD30 of HOYA Corporation, K-LASFN17 of SUMITA OPTICAL GLASS Inc., H-ZLAF68, and the like may be used.

Further, as a lens material, S-LAH66 of OHARA, Inc. is described but TAF1 of HOYA Corporation, K-LAFK50 of SUMITA OPTICAL GLASS Inc., H-LAF50B of CDGM Glass Co., Ltd, and the like may be used.

Still further, as a lens material, S-PHM52 of OHARA, Inc. is described but PCD4 of HOYA Corporation, K-PSKN2 of SUMITA OPTICAL GLASS Inc., H-ZPK1 of CDGM Glass Co., Ltd, and the like may be used.

Further, as a lens material, L-LAH53 of OHARA, Inc. is described but NBFD13 and M-NBFD130 of HOYA Corporation, K-LASFN1 of SUMITA OPTICAL GLASS Inc., H-ZLAF52 of CDGM Glass Co., Ltd, and the like may be used.

Still further, as a lens material, S-YGH51 of OHARA, Inc. is described but TAC6 of HOYA Corporation,

TABLE 7

Conditional Expression

| Example | (1) (R3F + R3R)/(R3F − R3R) | (2) vd2 | (3) f3/f | (4) f2/f | (5) f4/f | (6) vd4/vd5 | (7) f34/f | (8) vd1/vd2 | (9) L/f | (10) Bf/f | (11) f45/f | (12) f56/f |
|---|---|---|---|---|---|---|---|---|---|---|---|---|
| 1 | 1.80 | 18.90 | −2.62 | 1.69 | 1.76 | 0.78 | 3.60 | 1.22 | 4.64 | 0.77 | 0.91 | 3.39 |
| 2 | 1.89 | 18.90 | −2.57 | 1.61 | 1.57 | 0.64 | 3.11 | 1.00 | 4.22 | 0.64 | 0.77 | 3.22 |
| 3 | 1.78 | 18.90 | −2.07 | 1.53 | 1.37 | 0.65 | 2.71 | 1.00 | 4.01 | 0.59 | 0.73 | 4.31 |
| 4 | 1.74 | 18.90 | −2.41 | 1.71 | 1.46 | 0.64 | 2.77 | 1.00 | 4.13 | 0.62 | 0.75 | 3.53 |
| 5 | 1.84 | 17.47 | −3.05 | 2.63 | 1.52 | 0.64 | 2.47 | 1.21 | 4.32 | 0.73 | 0.80 | 2.99 |
| 6 | 1.81 | 18.90 | −2.80 | 3.21 | 1.34 | 0.64 | 2.10 | 0.83 | 4.15 | 0.95 | 0.74 | 2.90 |

K-LASKN1 of SUMITA OPTICAL GLASS Inc., H-LAK53 of CDGM Glass Co., Ltd, and the like may be used.

In the Examples 1 to 6, all the materials of the first lens L1 to the sixth lens L6 are glass, but plastic may be used. In this case, each lens may be produced inexpensively.

[Aberration Performance]

Each aberration diagram of imaging lens according to the foregoing Examples 1 to 6 is shown in A to D of FIGS. 8 to 13 respectively.

Here, the description will be made by taking the aberration diagrams of Example 1 as example, but the same applies to the other examples. A of FIG. 8, B of FIG. 8, C of FIG. 8, and D of FIG. 8 show aberration diagrams of spherical aberration, astigmatism, distortion, and lateral chromatic aberration respectively. "F" in the spherical aberration diagram represents F-number and ω in the other aberration diagrams represents half angle of view. The diagram of distortion illustrates a deviation from an ideal image height calculated as f×tan (ϕ), in which f is the focal length of the entire system and ϕ is the angle of view (treated as variable, 0≤ϕ≤ω). Each aberration diagram illustrates aberration with the d-line (wavelength 587.56 nm) as the reference wavelength, but the spherical aberration diagram also illustrates aberrations with respect to the F-line (wavelength 486.13 nm), the C-line (wavelength 656.27 nm), the s-line (wavelength 852.11 nm), and offence against the sine condition (denoted as SNC), while the lateral chromatic aberration diagram illustrates aberrations with respect to the F-line, the C-line, and the s-line. The line types in the lateral chromatic aberration diagram are the same as those in the spherical aberration diagram and, therefore, omitted in the lateral chromatic aberration diagram.

As is known from the foregoing data, the imaging lenses of Examples 1 to 6 are composes of a small number of lenses, i.e., six lenses, and may be formed small and inexpensively, yet have a small F-number of 1.8 to 2.0 and satisfactory optical performance through satisfactory correction of each aberration. These imaging lenses may be preferably used in surveillance cameras, vehicle cameras for taking images of the front side, the lateral sides, the rear side, and the like of a car, and the like.

[Embodiment of Imaging Apparatus]

FIG. 14 illustrates, as a usage example, a car 100 equipped with imaging apparatuses having imaging lenses of the present embodiment. In FIG. 14, the car 100 includes an out-vehicle camera 101 for imaging the dead area of the lateral side on the passenger side, an out-vehicle camera 102 for imaging the dead area on the rear side, and an in-vehicle camera 103, attached to the rear side of the rearview mirror, for imaging the same visual field range as that of the driver. Each of the out-vehicle cameras 101 and 102, and the in-vehicle camera 103 is an imaging apparatus according the present embodiment and includes an imaging lens of an example of the present disclosure and an image sensor that converts an optical image formed by the imaging lens to an electrical signal.

As the imaging lens according to an example of the present disclosure has aforementioned advantages, the out-vehicle cameras 101 and 102, and the in-vehicle camera 103 may be formed small and inexpensively, yet have a wide angle of view and is capable of obtaining a good image to a peripheral portion of the imaging area.

So far, the present disclosure has been described by way of embodiments and examples, but it should be understood that the present disclosure is not limited to the embodiments and examples described above, and various changes and modifications may be made. For example, values of radius of curvature, surface distance, refractive index, and Abbe number of each lens are not limited to those shown in each numerical example and may take other values.

Note that all of the lenses in the examples described above are formed of a uniform material, but a gradient index lens may be used. In an example described above, the second lens L2 and fourth lens L4 are formed of aspherical refractive lenses, but a diffractive optical element may be formed on one or more surfaces.

In the embodiment of the imaging apparatus, the description has been made of a case in which the present disclosure is applied to a vehicle camera by illustrating a drawing thereof, but the present disclosure is not limited to such application and may also be applied, for example, to cameras of portable terminals, surveillance cameras, and the like.

What is claimed is:

1. An imaging lens, consisting of a first lens having a negative power, a second lens having a positive power, a third lens having a negative power, a fourth lens having a positive power, a fifth lens having a positive power, and a sixth lens having a negative power, in order from the object side, wherein:

the Abbe number of the material of the sixth lens with respect to the d-line is less than or equal to 30; and
the following conditional expressions are satisfied:

$$1.35<(R3F+R3R)/(R3F-R3R)<6.0 \qquad (1)$$

$$vd3<30.0 \qquad (2)$$

where:

R3F is the radius of curvature of the object side surface of the third lens;
R3R is the radius of curvature of the image side surface of the third lens; and
vd3 is the Abbe number of the material of the third lens with respect to the d-line.

2. The imaging lens of claim 1, wherein the following conditional expression is satisfied:

$$1.0<f2/f \qquad (4)$$

where:

f2 is the focal length of the second lens; and
f is the focal length of the entire system.

3. The imaging lens of claim 2, wherein the following conditional expression is further satisfied:

$$1.1<f2/f<6.0 \qquad (4\text{-}2)$$

where:

f2 is the focal length of the second lens; and
f is the focal length of the entire system.

4. The imaging lens of claim 1, wherein the following conditional expression is satisfied:

$$1.0<f4/f \qquad (5)$$

where:

f4 is the focal length of the fourth lens; and
f is the focal length of the entire system.

5. The imaging lens of claim 4, wherein the following conditional expression is further satisfied:

$$1.1<f4/f<5.0 \qquad (5\text{-}2)$$

where:

f4 is the focal length of the fourth lens; and
f is the focal length of the entire system.

6. The imaging lens of claim 1, wherein the following conditional expression is satisfied:

$$0.15 < vd4/vd5 < 3.0 \tag{6}$$

where:
vd4 is the Abbe number of the material of the fourth lens with respect to the d-line; and
vd5 is the Abbe number of the material of the fifth lens with respect to the d-line.

7. The imaging lens of claim 1, wherein a material having a negative temperature coefficient of refractive index, dn/dt is used for a lens having a positive power in the lens system.

8. The imaging lens of claim 1, wherein the following conditional expression is satisfied:

$$1.5 < f34/f < 5.0 \tag{7}$$

where:
f34 is the combined focal length of the third lens and the fourth lens; and
f is the focal length of the entire system.

9. The imaging lens of claim 8, wherein the following conditional expression is further satisfied:

$$1.7 < f34/f < 4.7 \tag{7-1}$$

where:
f34 is the combined focal length of the third lens and the fourth lens; and
f is the focal length of the entire system.

10. The imaging lens of claim 8, wherein the following conditional expression is further satisfied:

$$1.8 < f34/f < 3.9 \tag{7-3}$$

where:
f34 is the combined focal length of the third lens and the fourth lens; and
f is the focal length of the entire system.

11. The imaging lens of claim 1, wherein the following conditional expression is satisfied:

$$0.3 < vd1/vd2 < 2.5 \tag{8}$$

where:
vd1 is the Abbe number of the material of the first lens with respect to the d-line; and
vd2 is the Abbe number of the material of the second lens with respect to the d-line.

12. The imaging lens of claim 11, wherein the following conditional expression is further satisfied:

$$0.4 < vd1/vd2 < 1.8 \tag{8-2}$$

where:
vd1 is the Abbe number of the material of the first lens with respect to the d-line; and
vd2 is the Abbe number of the material of the second lens with respect to the d-line.

13. The imaging lens of claim 1, wherein the following conditional expression is further satisfied:

$$1.35 < (R3F+R3R)/(R3F-R3R) < 3.3 \tag{1-2}$$

where:
R3F is the radius of curvature of the object side surface of the third lens; and
R3R is the radius of curvature of the image side surface of the third lens.

14. The imaging lens of claim 1, wherein the following conditional expression is further satisfied:

$$1.4 < (R3F+R3R)/(R3F-R3R) < 2.20 \tag{1-3}$$

where:
R3F is the radius of curvature of the object side surface of the third lens; and
R3R is the radius of curvature of the image side surface of the third lens.

15. The imaging lens of claim 1, wherein the following conditional expression is further satisfied:

$$vd3 < 20.0 \tag{2-2}$$

where,
vd3 is the Abbe number of the material of the third lens with respect to the d-line.

16. An imaging apparatus equipped with the imaging lens of claim 1.

17. An imaging lens, consisting of a first lens having a negative power, a second lens having a positive power, a third lens having a negative power, a fourth lens having a positive power, a fifth lens having a positive power, and a sixth lens having a negative power, in order from the object side, wherein:
the Abbe number of the material of the sixth lens with respect to the d-line is less than or equal to 30; and
the following conditional expression is satisfied:

$$1.35 < (R3F+R3R)/(R3F-R3R) < 2.20 \tag{1-1}$$

where:
R3F is the radius of curvature of the object side surface of the third lens; and
R3R is the radius of curvature of the image side surface of the third lens.

18. An imaging lens, consisting of a first lens having a negative power, a second lens having a positive power, a third lens having a negative power, a fourth lens having a positive power, a fifth lens having a positive power, and a sixth lens having a negative power, in order from the object side, wherein the following conditional expressions are satisfied:

$$vd3 < 20.0 \tag{2-2}$$

$$f3/f < -1.4 \tag{3}$$

where:
vd3 is the Abbe number of the material of the third lens with respect to the d-line;
f3 is the focal length of the third lens; and
f is the focal length of the entire system.

19. The imaging lens of claim 18, wherein the following conditional expression is further satisfied:

$$-5 < f3/f < -1.6 \tag{3-4}$$

where:
f3 is the focal length of the third lens; and
f is the focal length of the entire system.

* * * * *